US012235377B2

United States Patent
Dhekne et al.

(10) Patent No.: US 12,235,377 B2
(45) Date of Patent: Feb. 25, 2025

(54) ASYNCHRONOUS TIME DIFFERENCE OF ARRIVAL RANGING METHOD FOR PASSIVE-LISTENING DEVICES

(71) Applicant: GEORGIA TECH RESEARCH CORPORATION, Atlanta, GA (US)

(72) Inventors: Ashutosh Dhekne, Atlanta, GA (US); Haige Chen, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 18/271,912

(22) PCT Filed: Jan. 14, 2022

(86) PCT No.: PCT/US2022/012463
§ 371 (c)(1),
(2) Date: Jul. 12, 2023

(87) PCT Pub. No.: WO2022/155436
PCT Pub. Date: Jul. 21, 2022

(65) Prior Publication Data
US 2024/0069149 A1 Feb. 29, 2024

Related U.S. Application Data

(60) Provisional application No. 63/137,976, filed on Jan. 15, 2021.

(51) Int. Cl.
*G01S 5/14* (2006.01)
*G01S 1/24* (2006.01)

(52) U.S. Cl.
CPC . *G01S 5/14* (2013.01); *G01S 1/24* (2013.01)

(58) Field of Classification Search
CPC .................................... G01S 5/14; G01S 1/24
See application file for complete search history.

(56) References Cited

U.S. PATENT DOCUMENTS

| 2011/0156878 A1 | 6/2011 | Wu et al. |
| 2012/0252503 A1 | 10/2012 | Wu |

(Continued)

FOREIGN PATENT DOCUMENTS

CN    111479228 B    * 12/2021    ............... G01S 5/02

OTHER PUBLICATIONS

Synchronization-Free and Low Power TDOA for Radio Based Indoor Positioning M Von Tschirschnitz, M Wagner 2018 International Conference on Indoor Positioning and Indoor Navigation . . . (Year: 2018).*

(Continued)

*Primary Examiner* — Muthuswamy G Manoharan
(74) *Attorney, Agent, or Firm* — Meunier Carlin & Curfman LLC

(57) ABSTRACT

An exemplary method is disclosed that can passively listen for IEEE 802.15.4z communication between two active 802.15.4z devices to provide high-precision and reliable ranging and/or localization determination at a third device through tag time difference of arrival determination performed at the third device. Notably, the exemplary device (the third device) is not required to be in active communication with the two active messaging devices, nor is this third device an active participant in the ranging messaging between exchange between the two active messaging devices.

17 Claims, 12 Drawing Sheets

(56) References Cited

U.S. PATENT DOCUMENTS

| | | |
|---|---|---|
| 2016/0150499 A1 | 5/2016 | Aldana et al. |
| 2016/0277882 A1 | 9/2016 | Passler |
| 2018/0059235 A1 | 3/2018 | McLaughlin et al. |

OTHER PUBLICATIONS

IEEE, IEEE Standard for Local and metropolitan area networks—Part 15.4: Low-Rate Wireless Personal Area Networks (LR-WPANs), vol. 2011, Sep. 2011.

A. Ledergerber, M. Hamer, and R. D'Andrea, "A robot self-localization system using one-way ultra-wideband communication," IEEE Int. Conf. Intel. Robot. Syst., vol. 2015—Decem, pp. 3131-3137, 2015.

LAN/MAN Standards Committee. (2020). IEEE Standard for Low-Rate Wireless Networks. Amendment 1: Enhanced Ultra Wideband (UWB) Physical Layers (PHYs) and Associated Ranging Techniques (IEEE Std 802.15.4z) (vol. 2020). Retrieved from https://standards.ieee.org/standard/index.html.

Chan, Y. T., and Ho, K. C. "A Simple and Efficient Estimator for Hyperbolic Location" in 1994 IEEE Transaction on Signal Processing, vol. 42, Aug. 1994, pp. 1905-1915.

International Search Report and Written Opinion received in PCT/US2022/012463 mailed Apr. 12, 2023.

\* cited by examiner

ASYNCHRONOUS TIME DIFFERENCE OF ARRIVAL RANGING METHOD FOR PASSIVE-LISTENING DEVICES

RELATED APPLICATION

This application is a U.S. National Stage application filed under 35 U.S.C. § 371 of PCT/US2022/012463, filed Jan. 14, 2022, which claims priority to, and the benefit of, U.S. Provisional Application No. 63/137,976, filed Jan. 15, 2021, entitled "Asynchronous Passive Tag TDoA Ranging in Communication System," each of which is incorporated by reference herein in their entirety.

TECHNICAL FIELD

The present disclosure relates to wireless communication systems, e.g., ultra-wideband (UWB) wireless communication systems, in which the anchor devices can perform two-way ranging while the tag device passively overhears the ranging messages and finds the difference of the distance between itself and two different anchors.

BACKGROUND

The IEEE 802.15.4z standards for high-rate pulse repetition frequency (HRP) ultra-wideband (UWB) define a set of protocols for the physical layer (PHY) and medium access control (MAC) sub-layers for high precision and secure-ranging applications, e.g., for mobile and IoT devices. The IEEE 802.15.4 protocol stack is employed in ZigBee, 6LoWPAN, ZigBee IP, ISA100.11a, Wireless HART, Thread, among others, that allows two compliant devices to perform ranging operations between these two devices using time-of-flight (ToF) or angle-of-arrival (AoA) measurements. The ranging operation can provide reliable and robust ranging timestamps to accurately measure the distance and direction between devices (e.g., within less than 30 cm and with a range up to 100 meters).

There are benefits in reducing the hardware cost for ranging applications to make them more ubiquitous.

SUMMARY

An exemplary method is disclosed that can passively listen for IEEE 802.15.4z communication between two active 802.15.4z devices to provide high-precision and reliable ranging and/or localization determination at a third device through tag time difference of arrival determination performed at the third device. Notably, the exemplary device (the third device) is not required to be in an active communication with the two active messaging devices, nor is this third device an active participant in the ranging messaging between the exchanges between the two active messaging devices.

In some embodiment, the third device is configured to employ the ranging messaging protocol between two active 802.15.4z devices. The two active devices can be configured to embed measured time into the messages of the 3 two-way ranging (TWR) messages. The third device can determine its own ranging information by receiving and using only 3 two-way ranging messages exchanged between the two active messaging devices. Because the third device does not have to communicate with the active messaging device, the third device does not require nor consume any RF spectrum, nor does it require nor incur any additional processing power at the active messaging device.

The exemplary method can be employed at each of a set of third devices (e.g., as passive listening devices) that can operate with a set of beacon devices (as the set of active messaging devices) deployed/anchored in a given geographic area or facilities. The set of beacon devices is configured in this deployment (which can be a permanent deployment or temporary deployment) to transmit and receive ranging messages according to IEEE 802.15.4z protocols with nearby beacon devices. The set of beacon devices can be spaced out in the geographical area so each beacon device and a nearby neighbor can form a pair to provide ranging messages to be used by a third device for its TDOA determination. Within this area, each individual third device (e.g., as a passive-listening device) of the set of third devices can then traverse through the area and use the ranging messages between sets of nearby beacon devices to determine the TDOA of the ranging messages between the respective pairs of nearby beacon devices. Using three TDOA determinations among at least three beacon devices (e.g., between a first and second beacon device, a second and third beacon device, and the first and third beacon device), the passive-listening device can determine its position location (e.g., 2D position) from an intersection of hyperbolic curves produced from the TDOA estimates. Other positions, 1D, 3D, 4D (3D+time), can be determined as well. In configurations in which localization information of the beacon devices are made available to the passive-listening tag devices, the third device can calculate localization information based on the determined ranging information to nearby beacon devices.

Notably, in this configuration, a system comprising a plurality of these third devices (e.g., as passive-listening tags) can be employed in any number and execute its own ranging operation without adding any resource requirements on the beacon infrastructure as the number of third devices is increased. To this, the system can be scaled without adding overhead to the beacon infrastructure.

For IoT applications, the system can be deployed for an infinite number of passive-listening IoT ranging tags that use its ranging information to nearby anchored beacons. In other IoT applications, the system can be deployed for an infinite number of passive-listening IoT localization tags that use its ranging information (and provided localization information of the beacons) to determine the tags localization in a given geographic area or facility. Examples of these IoT applications can include low-cost mobile positioning applications, e.g., for routing. Another example is the use of IoT applications in sporting events, stadiums that can provide service triggered by self-identified locations. Another example is the use of passive-listening tags on aerial or terrestrial drones to provide localization information for the routing of the drones. The term "infinite number" as used above refers to a lack of constraint on the active beacon devices (i.e., active messaging devices) by the passive-listening devices in performing its respective TDoA ranging operation.

While examples are provided herein in relation to 802.15.4 and 802.15.4z, they are merely illustrative and are non-limiting examples, and any suitable ranging protocols may be used for the application of interest.

In an aspect, a method is disclosed comprising receiving at an asynchronous passive-listening TDoA device a first message transmitted from a first active device in a communication exchange with a second active device having a distance therebetween; receiving at the asynchronous passive-listening TDoA device a second message transmitted from the second active device in reply to the first transmitted message; receiving at the asynchronous passive-listening TDoA device a third message transmitted from the first active device in reply to the second transmitted message; determining, by a processor of the asynchronous passive-listening TDoA device, a first time difference between a first measured time corresponding to receipt of the first message and a second measured time corresponding to receipt of the second message; determining, by the processor, a second time difference between the second measured time corresponding to the receipt of the second message and a third measured time corresponding to receipt of the third message; and determining, by the processor, a time difference of arrival (TDoA) value corresponding to the distance between the first active device and the second active device using the first time difference, the second time difference, and one or more time measures included in the first transmitted message, the second transmitted message, or the third transmitted message, wherein the time difference of arrival (TDoA) value is used in a ranging or localization operation associated with the asynchronous passive-listening TDoA device.

In some embodiment, the time difference of arrival (TDoA) value between the first active device and the second active device is determined using the first time difference, the second time difference, a first time measure defined between a receipt of the second message at the first active device and the transmission of the third message by the first active device, and a second time measure defined between transmission of the first message and a receipt of the second message at the first active device.

In some embodiment, the time difference of arrival (TDoA) value, $T_{AB}$, is determined according to $$T_{AB} = \frac{D_A R_{T1} - R_{T2} R_A}{R_A + D_A} + \rho_{AB},$$

wherein $D_A$ is the first time measure defined between the receipt of the second message at the first active device and the transmission of the third message by the first active device, $R_A$ is the second time measure defined between the transmission of the first message and the receipt of the second message at the first active device, $R_{T1}$ is the first time difference between the first measured time corresponding to the receipt of the first message and the second measured time corresponding to receipt of the second message at the asynchronous passive-listening TDoA device, $R_{T2}$ is the second time difference between the second measured time corresponding to the receipt of the second message and the third measured time corresponding to the receipt of the third message, and $\rho_{AB}$ corresponds to the time between when the first message was transmitted at the first active device and received at the second active device.

In some embodiment, the time difference of arrival (TDoA) value between the first active device and the second active device is determined using the first time difference, the second time difference, a third time measure defined between a receipt of the first message at the second active device and the transmission of the second message by the second active device, and a fourth time measure defined between transmission of the second message and a receipt of the third message at the second active device.

In some embodiment, the time difference of arrival (TDoA) value, $T_{AB}$, is determined according to $$T_{AB} = \frac{R_B R_{T1} - R_{T2} D_B}{R_B + D_B} - \rho_{AB},$$

wherein $D_B$ is the third time measure defined between the receipt of the first message at the second active device and the transmission of the second message by the second active device, and $R_B$ is the fourth time measure defined between the transmission of the second message and the receipt of the third message at the second active device.

In some embodiment, the fourth time measure $R_B$ is included in a fifth message transmitted by the second active device in a subsequent cycle of a current cycle, wherein the current cycle includes the first, second, and third message, wherein the subsequent cycle includes a fourth message and a fifth message, and wherein the fifth message is transmitted from the second active device as the second message in the subsequent cycle in reply to a fourth message transmitted by the first active device.

In some embodiment, the time difference of arrival (TDoA) value between the first active device and the second active device is determined using the first time difference, the second time difference, a first time measure defined between a receipt of the second message at the first active device and the transmission of the third message by the first active device, a second time measure defined between transmission of the first message and a receipt of the second message at the first active device, a third time measure defined between a receipt of the first message at the second active device and the transmission of the second message by the second active device, and a fourth time measure defined between transmission of the second message and a receipt of the third message at the second active device.

In some embodiment, the time difference of arrival (TDoA) value, $T_{AB}$, is determined according to:

$$T_{AB} = \frac{D_A R_{T1} - R_{T2} R_A + R_B R_{T1} - R_{T2} D_B}{2(R_{T1} + R_{T2})},$$

wherein $D_A$ is the first time measure defined between the receipt of the second message at the first active device and the transmission of the third message by the first active device, $R_A$ is the second time measure defined between the transmission of the first message and the receipt of the second message at the first active device, $D_B$ is the third time measure defined between the receipt of the first message at the second active device and the transmission of the second message by the second active device, and $R_B$ is the fourth time measure defined between the transmission of the second message and the receipt of the third message at the second active device.

In some embodiment, $\rho_{AB}$ as a fifth-time measure is determined prior to the transmission of the first, second, and third messages.

In some embodiment, the first, second, and third messages are transmitted according to 802.15.4 or 802.15.4z protocols.

In another aspect, a device is disclosed comprising a nework interface; a processor unit or logic circuit coupled to the network interface, the processor unit or logic circuit being configured to: receive a first message transmitted from a first active device in a communication exchange with a second active device having a distance therebetween; receive a second message transmitted from the second active device that is replying to the first transmitted message; receive a third message transmitted from the first active device that is replying to the second transmitted message; determine a first time difference between a first measured time corresponding to receipt of the first message and a second measured time corresponding to receipt of the second message; determining a second time difference between the second measured time corresponding to the receipt of the second message and a third measured time corresponding to receipt of the third message; and determine a time difference of arrival (TDoA) value corresponding to the distance between the first active device and the second active device using the first time difference, the second time difference, and one or more time measures included in the first transmitted message, the second transmitted message, or the third transmitted message, wherein the time difference of arrival (TDoA) value is used in a ranging or localization operation associated with the asynchronous passive-listening TDoA device.

In some embodiment, the time difference of arrival (TDoA) value between the first active device and the second active device is determined using the first time difference, the second time difference, a first time measure defined between a receipt of the second message at the first active device and the transmission of the third message by the first active device, and a second time measure defined between transmission of the first message and a receipt of the second message at the first active device.

In some embodiment, the time difference of arrival (TDoA) value, $T_{AB}$, is determined according to:

$$T_{AB} = \frac{D_A R_{T1} - R_{T2} R_A}{R_A + D_A} + \rho_{AB},$$

wherein $D_A$ is the first time measure defined between the receipt of the second message at the first active device and the transmission of the third message by the first active device, $R_A$ is the second time measure defined between the transmission of the first message and the receipt of the second message at the first active device, $R_{T1}$ is a first time difference between the first measured time corresponding to the receipt of the first message and the second measured time corresponding to receipt of the second message at the asynchronous passive-listening TDoA device, $R_{T2}$ is the second time difference between the second measured time corresponding to the receipt of the second message and the third measured time corresponding to the receipt of the third message, and $\rho_{AB}$ corresponds to the time between when the first message was transmitted at the first active device and received at the second active device.

In some embodiment, the time difference of arrival (TDoA) value between the first active device and the second active device is determined using the first time difference, the second time difference, a third time measure defined between a receipt of the first message at the second active device and the transmission of the second message by the second active device, and a fourth time measure defined between transmission of the second message and a receipt of the third message at the second active device.

In some embodiment, the time difference of arrival (TDoA) value, $T_{AB}$, is determined according to:

$$T_{AB} = \frac{R_B R_{T1} - R_{T2} D_B}{R_B + D_B} - \rho_{AB},$$

wherein $D_B$ is the third time measure defined between the receipt of the first message at the second active device and the transmission of the second message by the second active device, and $R_B$ is the fourth time measure defined between the transmission of the second message and the receipt of the third message at the second active device.

In some embodiment, the fourth time measure $R_B$ is included in a fifth message transmitted by the second active device in a subsequent cycle of a current cycle, wherein the current cycle includes the first, second, and third message, wherein the subsequent cycle includes a fourth message and a fifth message, and wherein the fifth message is transmitted from the second active device as the second message in the subsequent cycle in reply to a fourth message transmitted by the first active device.

In some embodiment, the time difference of arrival (TDoA) value between the first active device and the second active device is determined using the first time difference, the second time difference, a first time measure defined between a receipt of the second message at the first active device and the transmission of the third message by the first active device, a second time measure defined between transmission of the first message and a receipt of the second message at the first active device, a third time measure defined between a receipt of the first message at the second active device and the transmission of the second message by the second active device, and a fourth time measure defined between transmission of the second message and a receipt of the third message at the second active device.

In some embodiment, the time difference of arrival (TDoA) value, $T_{AB}$, is determined according to:

$$T_{AB} = \frac{D_A R_{T1} - R_{T2} R_A + R_B R_{T1} - R_{T2} D_B}{2(R_{T1} + R_{T2})},$$

wherein $D_A$ is the first time measure defined between the receipt of the second message at the first active device and the transmission of the third message by the first active device, $R_A$ is the second time measure defined between the transmission of the first message and the receipt of the second message at the first active device, $D_B$ is the third time measure defined between the receipt of the first message at the second active device and the transmission of the second message by the second active device, and $R_B$ is the fourth time measure defined between the transmission of the second message and the receipt of the third message at the second active device.

In some embodiment, $\rho_{AB}$ as a fifth-time measure is determined prior to the transmission of the first, second, and third messages.

In another aspect, a non-transitory computer readable medium is disclosed having instructions stored thereon, wherein execution of the instructions by a processor cause the processor to: receive a first message transmitted from a first active device in a communication exchange with a second active device having a distance therebetween; receive a second message transmitted from the second active device that is replying to the first transmitted message; receive a third message transmitted from the first active device that is replying to the second transmitted message; determine a first time difference between a first measured time corresponding to receipt of the first message and a second measured time corresponding to receipt of the second message; determining a second time difference between the second measured time corresponding to the receipt of the second message and a third measured time corresponding to receipt of the third message; and determine a time difference of arrival (TDoA) value corresponding to the distance between the first active device and the second active device using the first time difference, the second time difference, and one or more time measures included in the first transmitted message, the second transmitted message, or the third transmitted message, wherein the time difference of arrival (TDoA) value is used in a ranging or localization operation associated with the asynchronous passive-listening TDoA device.

BRIEF DESCRIPTION OF THE DRAWINGS

The skilled person in the art will understand that the drawings described below are for illustration purposes only.

DETAILED SPECIFICATION

Each and every feature described herein, and each and every combination of two or more of such features, is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

Example System

Figure 1:
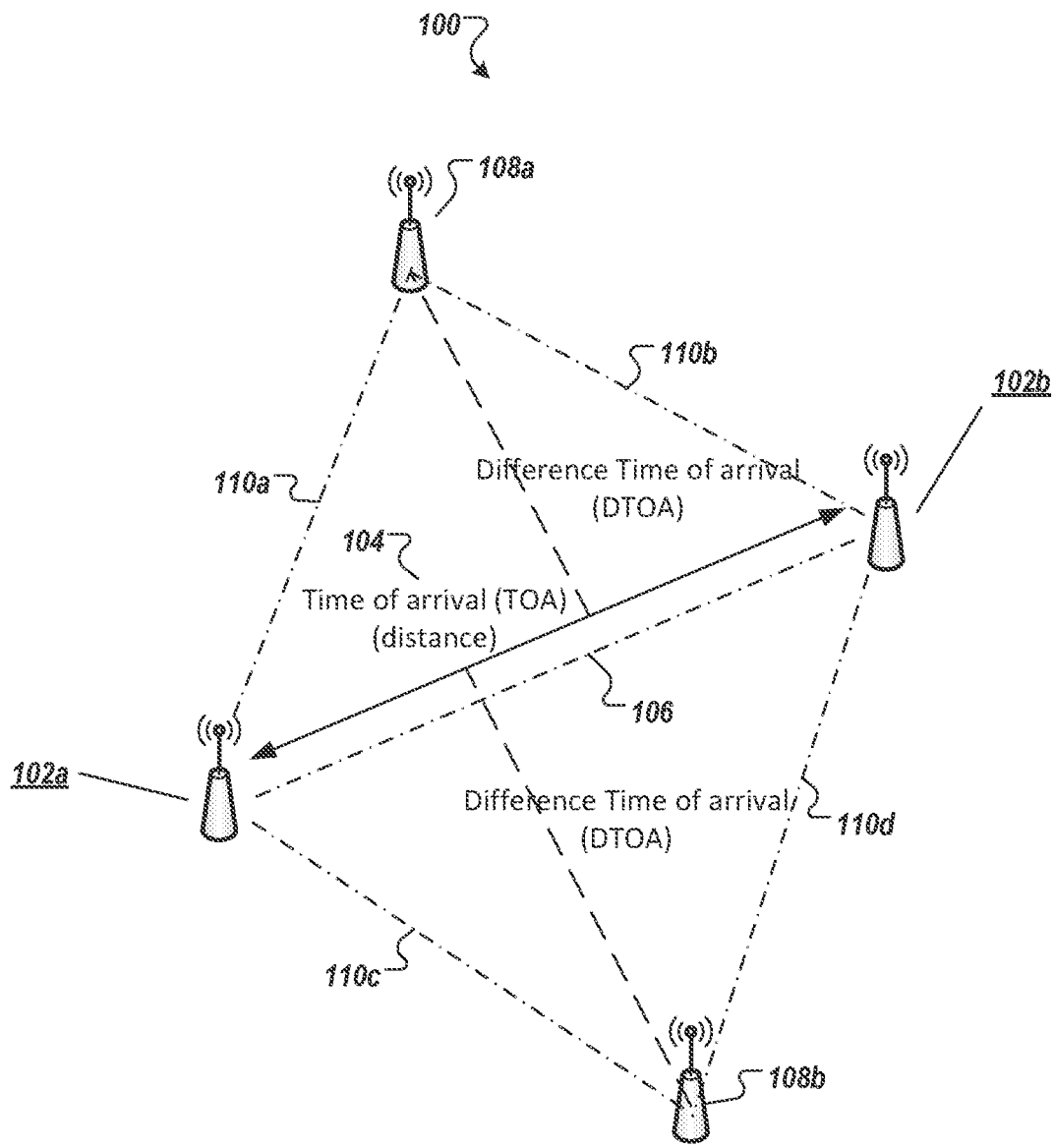
FIG. 1 shows an example asynchronous passive-listening TDoA system comprising a set of active messaging devices that are broadcasting ranging messages between each other in accordance with an illustrative embodiment.

FIG. 1 shows an example asynchronous passive-listening TDoA system 100 comprising a set of active messaging devices 102 (shown as 102a and 102b) that are broadcasting ranging messages 104 between each other. The messages 104 facilitate the determination of time difference of arrival (TDoA) values 106 between the two active messaging devices 102a and 102b. In some embodiments, the messages 104 are transmitted and replied according to the ranging protocol defined in IEEE 802.15.4z for high-rate pulse repetition frequency (HRP) ultra-wideband (UWB). The asynchronous passive-listening TDoA system 100 further includes one or more asynchronous passive-listening TDoA devices 108 (e.g., 108a) that can passively receive the ranging messages 104 being exchanged between the two active messaging devices 102a, 102b and use the received ranging messages 104 and the ranging-based parameters provided therein to calculate its own set of ranges (110a, 110b) to the two active messaging devices 102a, 102b. A second asynchronous passive-listening TDoA device 108 (e.g., 108b) can passively receive the same ranging messages 104 being exchanged between the two active messaging devices 102a, 102b and use the same received ranging messages 104 and the ranging-based parameters provided therein to calculate its own set of TDoA parameters (110c, 110d) to the two active messaging devices 102a, 102b. Multiple TDoA parameters corresponding to multiple nearby active messaging devices can then be employed in a TDoA hyperbola position operation to provide the localization information for the asynchronous passive-listening TDoA devices (e.g., 108a or 108b).

Figure 2:
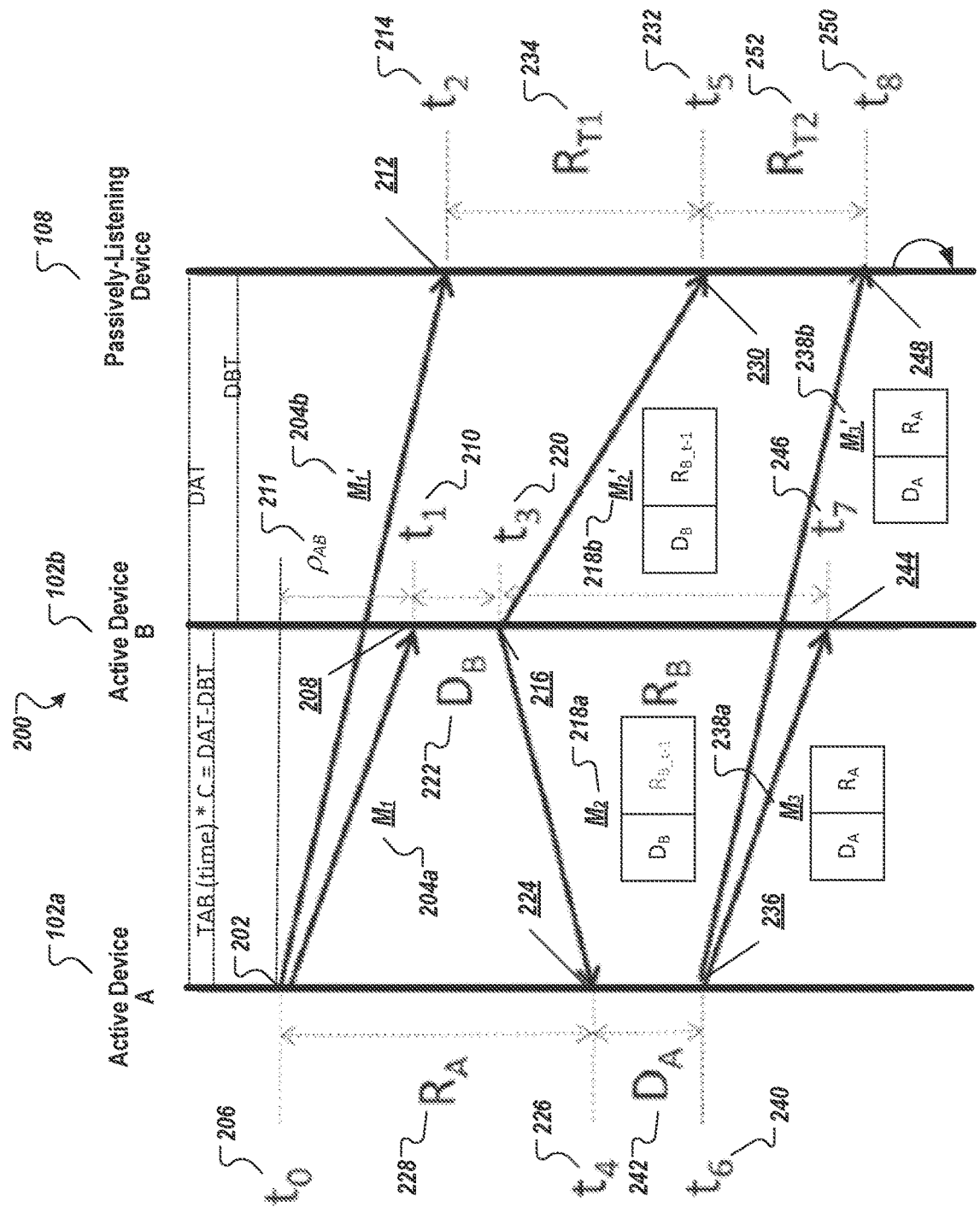
FIG. 2 shows a three-message exchange (e.g., according to IEE 802.15.4) that can be passively acquired by the passive-listening device to determine the TDoA value between the two active devices performing the three message exchanges in accordance with an illustrative embodiment.

Example Asynchronous Passive-Listening TDoA Operation Using 802.15.4z Ranging Message Exchanges FIG. 2 shows an asynchronous passive-listening TDoA operation 200 that may be executed at a passive-listening device 108 to ascertain ranging or localization information between the passive-listening device 108 and two active devices (shown as active device "A" 102a and active device "B" 102b) by passively listening to ranging message exchanges between two active devices 102a and 102b. In each of the examples shown in FIGS. 2A and 2B, the two active devices are engaged in an asynchronous double-sided two-way ranging (TWR) operation by exchanging a set of messages. Three messages "M1," "M2," and "M3" are transmitted between the two active devices 102a and 102b, which can be used by the passive-listening device 108 to determine its ranging or localization information with respect to the two active devices 102a, 102b.

From the three message exchanges, a series of measures are performed at the active devices 102a, 102b that are shared among each other to facilitate the computation of ToA information between the active devices 102a, 102b, which can then be used for ranging or localization computation at the active devices. The three message exchanges are also received (intentionally or unintentionally) by the passive-listening device 108, which can measure time values for its TDoA determination. Table 1 shows a list of the measures that can be measured and shared, e.g., compliant to 802.15.4z standards. Other ranging standards ma be used. Table 2 shows a list of measures that are measured at the passive-listening device 108.

Based on data from at least one of these messages (e.g., $D_A$ and $R_A$; $D_B$ and $R_B$; or combination of both) and measured time values determined at the passive-listening device 108 from the passive listening of the messages, the passive-listening device 108 can determine the TDoA information, $T_{AB}$, between the two active devices 102a and 102b per Equations 1, 2, and 3. In some embodiment, rather than the transmission of derived measured time values, e.g., $D_A$, $R_A$, $D_B$, or $R_B$, the messages can be embedded with the measured time values, e.g., $t_0$, $t_1$, $t_2$, $t_3$, $t_4$, $t_5$, $t_6$, $t_7$, etc. Table 1 shows the measured time parameters being provided through the first, second, and third message. These parameters can also transmitted through other communication channels or messages. In some embodiment, the time measure can be pre-computed for a set of fixed active devices and stored for distribution.

TABLE 1

| Parameters | Description | Source |
|---|---|---|
| $D_A$ ($t_4$, $t_6$) | Measured time between the receipt of message $M_2$ and the transmission of message $M_3$ at Device A | Message $M_1$ or $M_3$ from Device A. |
| $R_A$ ($t_0$, $t_4$) | Measured time between the transmission of message $M_1$ and the receipt of message $M_2$ at Device A | Message $M_1$ or $M_3$ from Device A |
| $D_B$ ($t_1$, $t_3$) | Measured time between the receipt of message $M_1$ and the transmission of message $M_2$ at Device B | Message $M_2$ from Device B |
| $R_B$ ($t_3$, $t_7$) | Measured time between transmission of message $M_2$ and receipt of message $M_3$ at Device B | Message $M_2$* from Device B |

TABLE 2

| Parameters | Description | Source |
|---|---|---|
| $R_{T1}$ | Measured time between $M_1$ and $M_2$ at the passive-listening device | Internally measured at the passive listening device |
| $R_{T2}$ | Measured time between $M_2$ and $M_3$ at the passive-listening device | Internally measured at the passive listening device |

$$T_{AB} = \frac{D_A R_{T1} - R_{T2} R_A}{R_A + D_A} + \rho_{AB} \quad \text{(Eq. 1)}$$

$$T_{AB} = \frac{R_B R_{T1} - R_{T2} D_B}{R_B + D_B} - \rho_{AB} \quad \text{(Eq. 2)}$$

$$T_{AB} = \frac{D_A R_{T1} - R_{T2} R_A + R_B R_{T1} - R_{T2} D_B}{2(R_{T1} + R_{T2})} \quad \text{(Eq. 3)}$$

In Equations 1, 2, and 3, the TDoA measure $T_{AB}$ between the active devices 102a and 102b can be determined using internally measured times, $R_{T1}$ and $R_{T2}$, determined using the time when the three 802.15.4z message exchanges between the active devices 102a and 102b are received at the passive-listening device 108 in addition to using the measured time logged at the active device(s) included in the message exchange, $D_A$ and $R_A$, $D_B$ and $R_B$, or the combination of $D_A$, $R_A$, $D_B$, $R_B$.

In Equation 1, the TDoA measure $T_{AB}$ is determined using the measured time information, $D_A$ and $R_A$, determined at the first active device 102a, the internally measured time, $R_{T1}$ and $R_{T2}$, and a measure $\rho_{AB}$ corresponding to when the first message is transmitted at the first active device 102a and received at the second active device 102b. This measure $\rho_{AB}$ is a constant and has a constant value for a set of fixed active devices (e.g., beacon) and can be pre-acquired prior to the three-message exchange and made available to the passive-listening device 108. In some embodiment, e.g., as discussed further herein, the passive-listening device 108 can execute a ranging application that provides the measure constant $\rho_{AB}$ from a set of active beacon devices 102. The measure $\rho_{AB}$ may have been acquired during the infrastructure startup or calibration and provided to the passive-listening device 108. The measure $\rho_{AB}$ may also be embedded into the transmitted messages (e.g., M1, M2, M3, or other application message).

Equation 2 is almost identical to Equation 1. The TDoA measure $T_{AB}$ of Equation 2 is also determined using the measured time information, the internally measured time, $R_{T1}$ and $R_{T2}$, and the measure constant $\rho_{AB}$. However, rather than using the measure acquired at the first active device 102a, Equation 2 employs the measured time information, $D_B$ and $R_B$, determined at the second active device 102b.

Equation 3 does not require the measure $\rho_{AB}$ but requires both the measured time information at the first active device, $D_A$ and $R_A$, and the measured time information at the second active device, $D_B$ and $R_B$, as well as the internally measured time, $R_{T1}$ and $R_{T2}$, at the passive-listening device 108. Because one of the measure time information, $D_B$, that is transmitted by the second active device 102b is not available when the second active device 102b performs the transmission, the measure time information, $D_B$, in the next messaging cycle can be employed. In some embodiment, the measure time information, $D_B$, from a prior cycle can be used, though it could introduce a source of localization error without some aspect of compensation.

FIG. 2 shows a three-message exchange, e.g., according to 802.15.4, that can be passively acquired by the passive-listening device 108 to determine the TDoA value between the two active devices performing the three message exchanges.

First message. The active device "A" 102a transmits (202) message $M_1$ (204a) at time $t_0$ (206). The message $M_1$ (204) is received (208) by active device "B" 102b at time $t_1$ (210) after an unknown time-of-flight from active device A, $\rho_{AB}$ (211). The same first message (shown as $M_1'$ 204b) is also received (212) by the passive-listening device 108 at time $t_2$ (214). As noted above, the measure pas can be considered as a constant value in the calculation of Equations 1 or 2 and may be made available to the passive-listening device 108, e.g., during the device initialization or through a separate communication channel or message.

Second message. The active device "B" 102b (which is in the active ranging operation device "A") then responds by transmitting (216) message $M_2$ (218) at $t_3$ (220). Device "B" 102b can measure/log the response delay $D_B$ (222) as the difference between the time of receipt $t_1$ 210 of the first message $M_1$ (204a) and the time of transmission $t_3$ (220) at the second active device 102b. The second message $M_2$ (218a) is received (224) by the active device "A" 102a at time $t_4$ (226). Device "A" 102a can measure/log the time $t_0$ (206) and the time of the second message receipt $t_4$ (26) to compute the difference between them as "$R_A$" (228). The same second message (shown as $M_2'$ 218b) is also received (230) by the passive-listening device 108 at time $t_5$ (232). The passively-listening device 108 can measure/log and calculate the time difference between time $t_2$ (214) and the time $t_5$ (232) as the "$R_{T1}$" 234.

Third message. The active device "A" 102a, upon receiving (224) message $M_2$ (218a), then responds by transmitting (236) message $M_3$ (238a) at time $t_6$ (240). Device "A" 102a can log the time of receipt $t_4$ 226 of the second message $M_2$ (218a) and the time of the second message transmission $t_6$ (240) to compute the difference between them as the response delay $D_A$ (242). The third message $M_3$ (238a) is received (244) by the active device "B" 102b at time $t_7$ (246). The same third message (shown as $M_3'$ 238b) is also received (248) by the passive-listening device 108 at time $t_8$ (250). The passively-listening device 108 can measure/log and calculate the time difference between time $t_5$ (232) and the time $t_8$ (250) is "$R_{T2}$" 252.

In the example shown in FIG. 2, Device "A" 102a is configured to generate the message $M_3$ (238a) with the values of $R_A$ and $D_A$ provided therein for the transmission (236) in accordance with 802.15.4z. In alternative embodiments, the values of $R_A$ and $D_A$ can be transmitted in a next cycle (e.g., in a part of the next cycle or a separate message).

Device "B" 102b is configured to generate the message $M_2$ (218a) with the values of $R_B$ provided therein for the transmission (216) in accordance with 802.15.4z. Message $M_2$ (218a) can be modified to also include values of $D_B$, e.g., from the prior cycle (shown as "$R_{B\_t-1}$"). As noted above, the values of $D_B$, and/or $R_B$, can be transmitted in a next cycle (e.g., in a part of the next-cycle first message, the next-cycle third message, or a separate message).

In some embodiment, e.g., when three or more active devices are involved, the message sent by the active device "A" 102a at time to (202) (FIG. 2) can be assumed to be a broadcast message to be received by multiple receivers, like active device "B" 102b (among others), which could then take turns in responding to the first active device "A" 102a.

Following the three-message exchange, the passive-listening device 108 can compute, via a processor, the TDoA between active devices 102a, 102b according to any one of Equations 1, 2, or 3. In having multiple TDoA from different active devices, the passive-listening device 108 can determine its localization or ranging using, e.g., TDOA hyperbola positioning, e.g., described in Chan, Y. T., and Ho, K. C. "A Simple and Efficient Estimator for Hyperbolic Location" in 1994 IEEE Trasaction on Signal Processing, Vol. 42, August 1994, which is incorporated by reference herein in its entirety.

The processing unit may be a standard programmable processor that performs arithmetic and logic operations necessary for the operation of the computing device. As used herein, processing unit and processor refers to a physical hardware device that executes encoded instructions for, or have circuitries configured, to perform functions on inputs and creating outputs, including, for example, but not limited to, microprocessors (MCUs), microcontrollers, graphical processing units (GPUs), and application-specific circuits (ASICs).

Clock drift derivations. Clock drift derivations can be determined as a measure of the robustness to the exemplary method. Based on Equation 1, the measured $\hat{T}_{AB}$ which is affected by clock drift may be determined per Equation 4A:

$$\hat{T}_{AB} = \frac{\hat{D}_A \hat{R}_{T1} - \hat{R}_{T2}\hat{R}_A}{(\hat{D}_A + \hat{R}_A)} + \rho_{AB}$$ (Eq. 4A)

$$= \frac{(1+\delta_A)(1+\delta_T)}{(1+\delta_A)} \frac{D_A R_{T1} - R_{T2}R_A}{(D_A + R_A)} + \rho_{AB}$$

$$= \frac{(1+\delta_T)(D_A R_{T1} - R_{T2}R_A)}{(D_A + R_A)} + \rho_{AB}$$

The measurement error due to clock drift may be determined per Equation 4B:

$$\hat{T}_{AB} - T_{AB} = \frac{\delta_T(D_A R_{T1} - R_{T2}R_A)}{(D_A + R_A)}$$ (Eq. 4B)

$$= \delta_T(T_{AB} - \rho_{AB})$$

Similarly, the measurement error due to clock drift of Equation 2 and Equation 3 can be derived to be $\delta_T(T_{AB}+\rho_{AB})$ and $$\frac{(\delta_B + \delta_A)T_{AB} + (\delta_B - \delta_A)\rho_{AB}}{2},$$

respectively.

UWB devices may have permissible clock drifts of up to 20 ppm, according to IEEE 802.15.4. Assuming the largest possible drift, the error is on the order of pico-seconds and is not dependent on any specific system configurations. Therefore, the estimated $\hat{T}_{AB}$ can accurately represent the actual TDoA $T_{AB}$.

Example Localization Operation

An utility of precise TDoA measurements is localization. The active anchor devices can be placed, e.g., throughout an indoor or outdoor space while people and robots can carry tag devices (e.g., as the asynchronous passive-listening TDoA device) to provide localization information and/o navigate.

One-dimensional localization. Given a constraint in which that all anchor and tag devices are physically located on on the same line, with two anchors "A" and "B", a tag (as an asynchronous passive-listening TDoA device) can uniquely localize itself on this line between two anchors. This scenario setting can occur, e.g., for localization in a long corridor or a straight road. In instances in which the anchors "A" and "B" have one-dimensional location $x_A$ and $x_B$, respectively, the location of a tag $x_T$ can be computed from the TDoA measurement $e_{AB}$ per Equation 5A in which c is the speed of light.

$$T_{AB}xc = \begin{cases} (x_B - x_T) - (x_T - x_A) = x_A + x_B - 2x_T, & \text{if } x_A < x_T < x_B \\ (x_B - x_T) - (x_A - x_T) = x_B - x_a, & \text{if } x_T < x_A < x_B \\ (x_T - x_B) - (x_T - x_A) = x_A - x_B, & \text{if } x_A < x_B < x_T \end{cases}$$ (Eq. 5A)

If the tag is located between anchors "A" and "B" (i.e., $x_A < x_T < x_B$ per Eq. 5A, the location of the tag can be uniquely determined as follow:

$$x_T = \frac{x_A + x_B - T_{AB}xc}{2}$$ (Eq. 5B)

Two-dimensional localization. To determine 2D localization of a tag with respect to three or more active anchor devices (e.g., N devices) deployed at locations $(x_1, y_1)$, $(x_2, y_2)$, ..., $(x_N, y_N)$, e.g., on a building floor, the active anchor devices can perform TWR with one another and the tag device (e.g., as the asynchronous passive-listening TDoA device) can listen to the communications and computes the TDoA values $T_{12}$, $T_{13}$, . . . $T_{1N}$ to each pair of anchors it hears. Anchor "1" can be assigned the role of initiating the TWR in this example. The 2D localization position (xT, yT) for the tag can be determined using a define the system of equations:

$$\sqrt{(x_T - x_2)^2 + (y_T - y_2)^2} - \sqrt{(x_T - x_1)^2 + (y_T - y_1)^2} = T_{12}xc \quad \text{(Eq. 5C)}$$

$$\sqrt{(x_T - x_3)^2 + (y_T - y_3)^2} - \sqrt{(x_T - x_1)^2 + (y_T - y_1)^2} = T_{13}xc$$

$$\ldots$$

$$\sqrt{(x_T - x_N)^2 + (y_T - y_N)^2} - \sqrt{(x_T - x_1)^2 + (y_T - y_1)^2} = T_{1N}xc$$

Solving the system of equations returns the location of the tag. Geometrically, each equation defines a hyperbolic line, and solving for the tag location can be seen as solving for the intersection of multiple hyperbolas. However, in practice, the TDoA measurements are noisy, and the corresponding hyperbolas do not always intersect at common point. Least square solvers, recursive solvers or gradient descent solvers can be employed to solve for an approximate solution.

Figure 3:
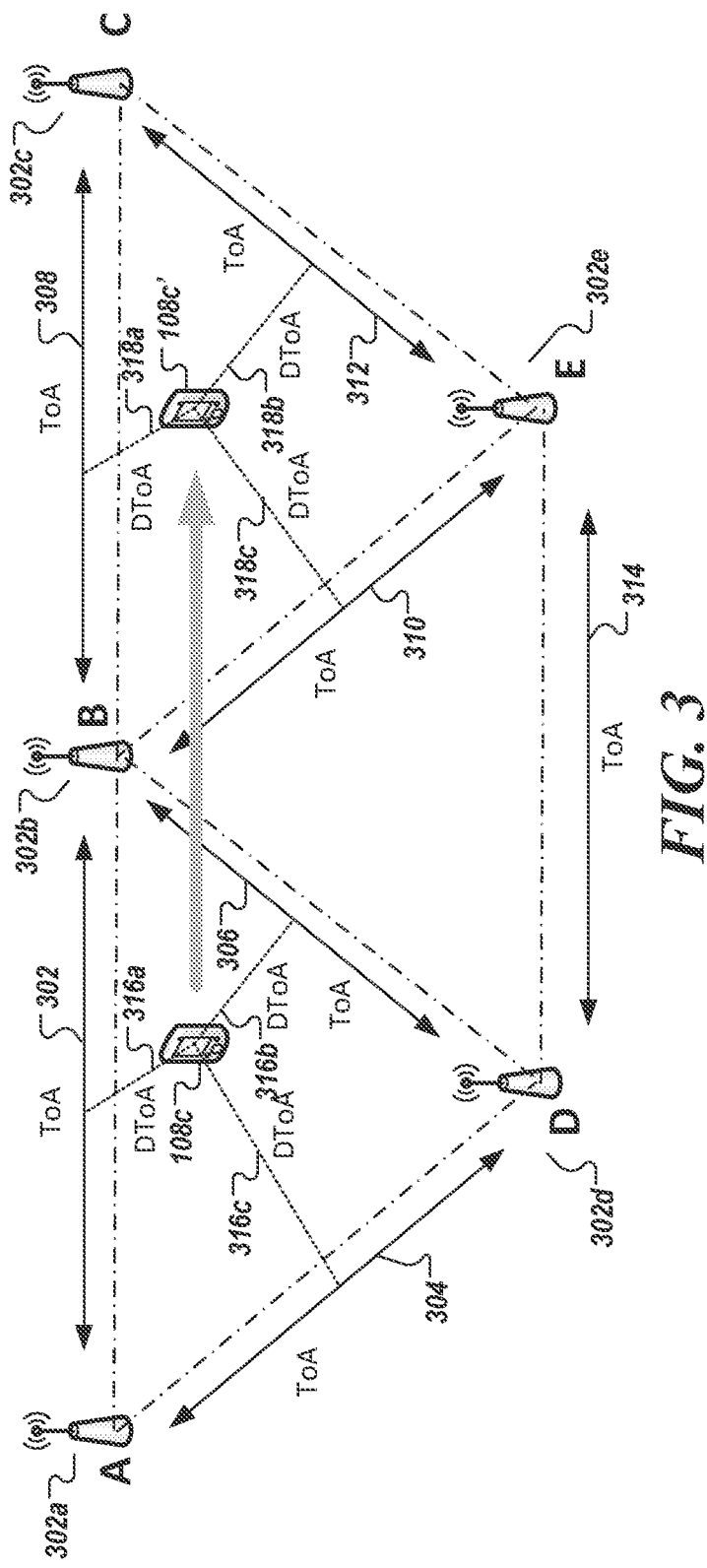
FIG. 3 shows a localization operation and infrastructure using the asynchronous passive-listening TDoA operation of FIGS. 1 and 2 in accordance with an illustrative embodiment.

FIG. 3 shows a localization operation and infrastructure using the asynchronous passive-listening TDoA operation of FIGS. 1 and 2 in accordance with an illustrative embodiment. In the example shown in FIG. 3, the asynchronous passive-listening TDoA device 108 (shown as 108c) is shown at two instances in time in a networking infrastructure 300 comprising a plurality of active devices 102 configured as beacons shown as active beacon device "A" 302a, device "B" 302b, device "C" 302c, device "D" 302e, device "E" 302e. The active beacon devices (302a-302e) are engaged in active ranging messaging 304 with one another.

For example, in a given update to a localization application executing at the passive-listening device 108c, device "A" 302a has conducted (i) an 802.15.4z three-message exchange 304, e.g., as described in relation to FIG. 2 with device "B" 302b and (ii) an 802.15.4z three-message exchange 306 with device "D" 302d. Device "B" 302b has conducted exchange 302 and additionally (iii) an 802.15.4z three-message exchange 306 with Device "D" 302d, (iv) an 802.15.4z three-message exchange 308 with Device "C" 302c, and (v) an 802.15.4z three-message exchange 310 with Device "E" 302e. Device "C" 302c has conducted exchange 308 and additionally (vi) an 802.15.4z three-message exchange 312 with Device "E" 302e. Device "D" 302d has conduced exchanges 304, 306 and additionally (vii) an 802.15.4z three-message exchange 314 with Device "E" 302e. Device "E" 302e has conduced exchanges 310, 312, and 314. In implementations, the active beacon devices may communicate with any nearby beacon in its range, e.g., device "D" 302d may also perform an 802.15.4z three-message exchange (not shown) with device "C" 302c.

In the example shown in FIG. 3, at a location (shown via 108c), the listening device 108c is shown to passively listen 316 (shown as 316a, 316b, and 316c, respectively) to three sets of three-message exchanges 302, 304, 306 between devices "A" and "B," "B" and "D" and "A" and "D." The listening device 108c can compute TDoA values $DTOA_{AB}$, $DTOA_{BD}$, and $DTOA_{AD}$, between these 3 devices and employ the TdoA values, $DTOA_{AB}$, $DTOA_{BD}$, and $DTOA_{AD}$, e.g., in a hyperbolic solver to determine the location of the listening device 108c.

In a second time instance subsequent to the first, the listening device 108c (now shown as 108c') is shown to passively listen 318 (shown as 318a, 318b, and 318c, respectively) to a different three set of three-message exchanges 308, 310, 312 between devices "B" and "C", "B" and "E" and "C" and "E." The listening device 108c can compute TDoA values $DTOA_{BC}$, $DTOA_{BE}$, and $DTOA_{CE}$, between these 3 devices and employ the TdoA values, $DTOA_{BC}$, $DTOA_{BE}$, and $DTOA_{CE}$, e.g., in the hyperbolic solver to determine the location of the listening device 108c'. As noted, an example of the hyperbolic solver is described in Chan, Y. T., and Ho, K. C. "A Simple and Efficient Estimator for Hyperbolic Location" in 1994 IEEE Trasaction on Signal Processing, Vol. 42, August 1994. Equations 1, 2, or 3 can be used for the determination of the various DtoAs in FIG. 3 in accordance with the operation described in FIG. 2.

Figure 4:
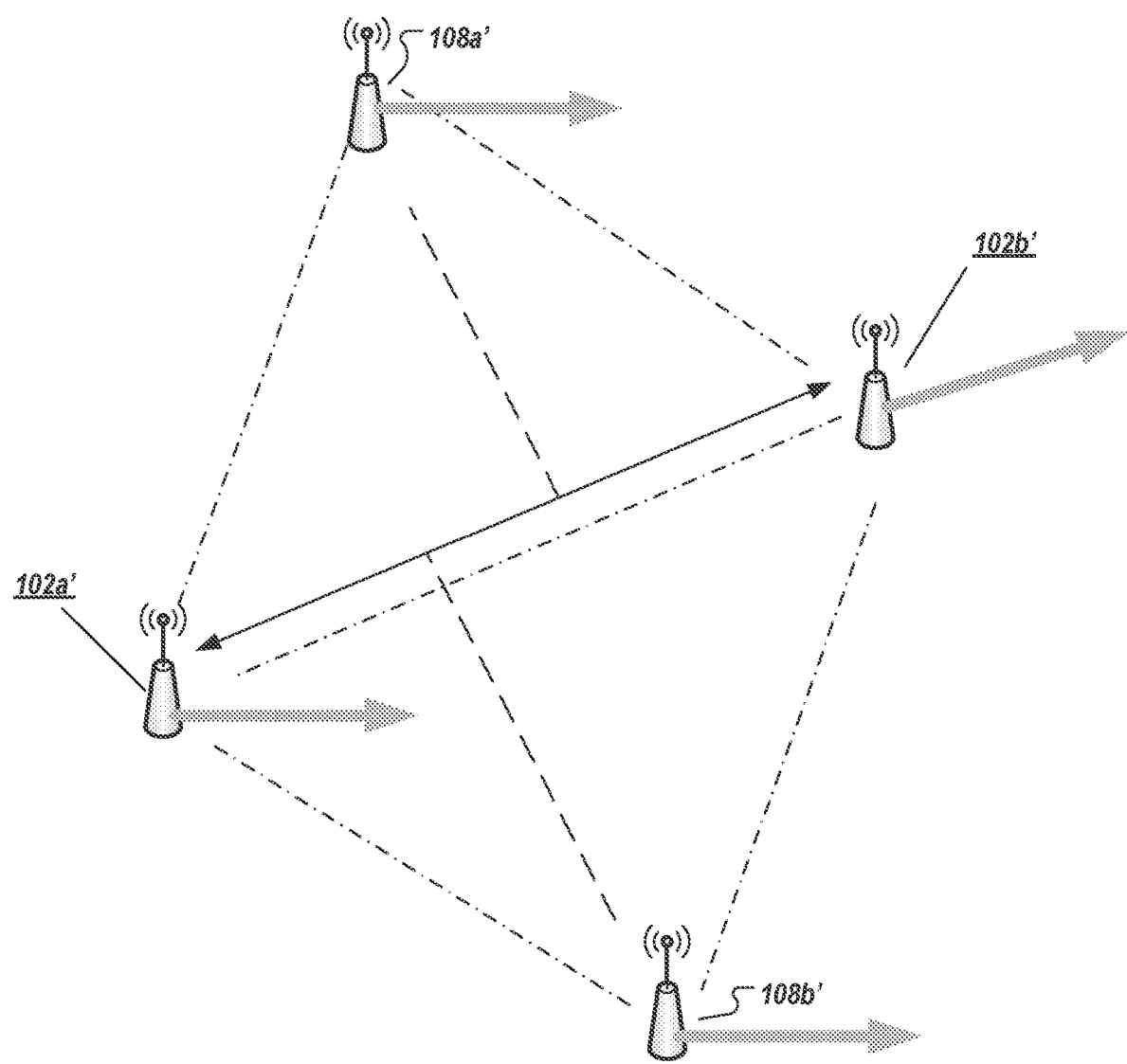
FIG. 4 shows another localization operation using the asynchronous passive-listening TDoA operation of FIGS. 1 and 2 in accordance with an illustrative embodiment.

FIG. 4 shows another localization operation using the asynchronous passive-listening TDoA operation of FIGS. 1 and 2 in accordance with an illustrative embodiment. In FIG. 4, rather than active devices 102a', 102b' being fixed in location, they are shown being in motion. The asynchronous passive-listening TDoA device(s) 108a' (and/or 108b') are also shown in motion in relation to the active devices. In this scenario, asynchronous passive-listening TDoA device can employ the operation and calculation described in relation to Equation 3. It would employ the time metrics assessed at each of the active devices, $D_A$, $D_B$, $R_A$, and $R_B$, and potentially provided through the 3-message exchange to determine the time difference of arrival value between the active device 102a', 102b'.

Figure 5:
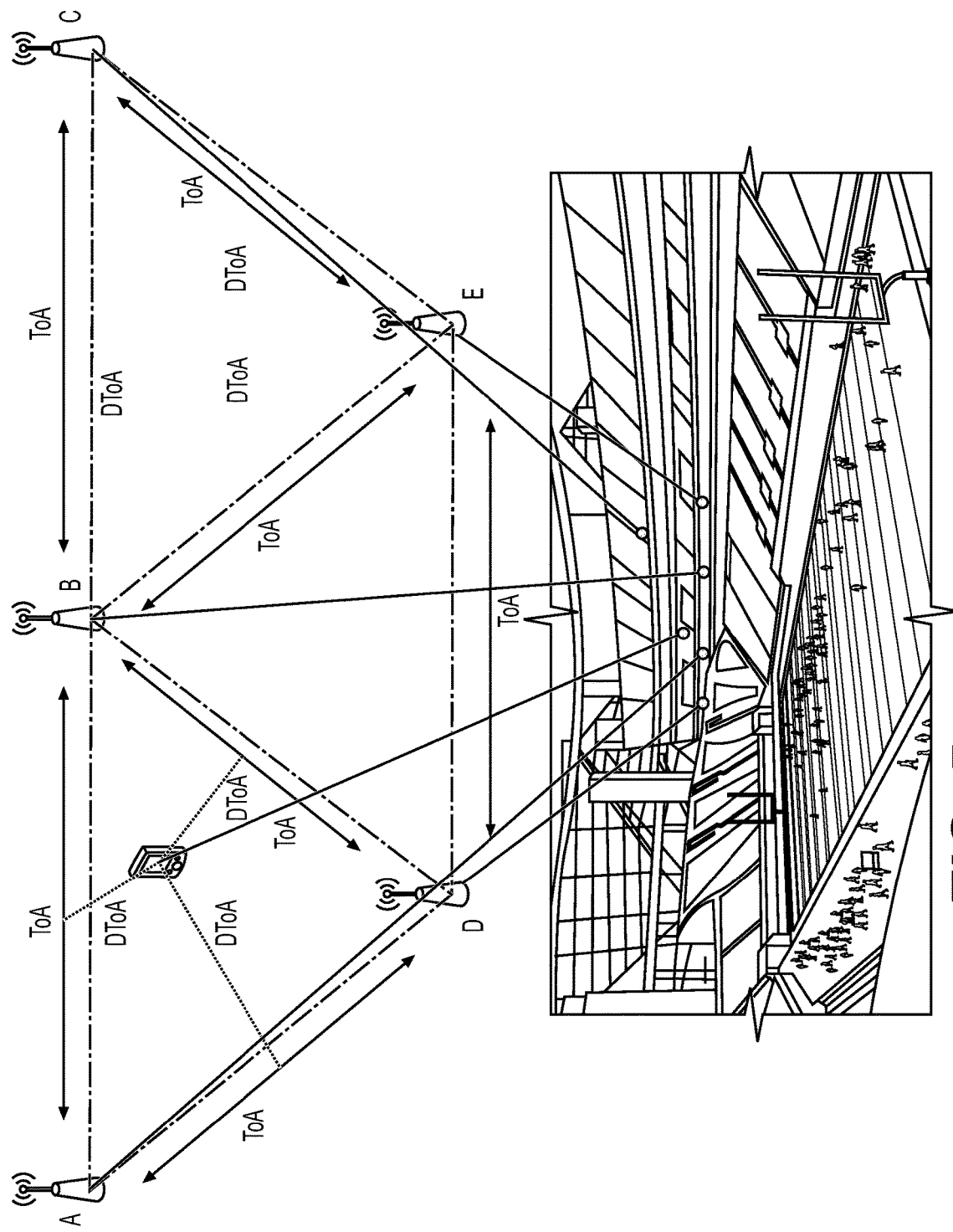
FIG. 5 shows an example implementation of the networking infrastructure of FIG. 3 for an indoor localization operation in accordance with an illustrative embodiment.

FIG. 5 shows an example implementation of the networking infrastructure of FIG. 3 for an indoor localization operation. The active beacon devices (e.g., 102) may be deployed among different floors of an indoor facility. The asynchronous passive-listening TDoA device (e.g., 108) can, in most embodiments, determine its localization or range using three TDoA measurements from three pairings among three sets of active beacon devices (e.g., 102). Three measurements can provide 2-D localization or ranging information among the active beacon devices, and the fourth measurements can provide 3-D localization or ranging information.

Experimental Results and Examples

Figure 6:
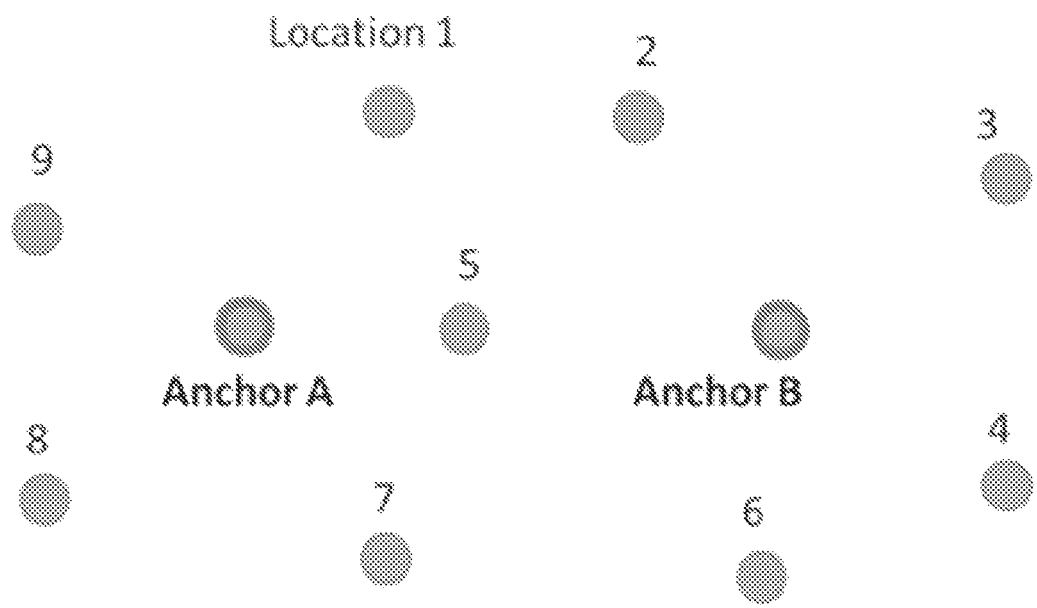
FIG. 6 shows an experimental setup for the asynchronous passive-listening TDoA operation, the setup comprising a set of two active anchor devices and a listening device in accordance with an illustrative embodiment.

A study was conducted to test the performance of the exemplary asynchronous passive tag TDoA system and devices. In the study, two anchors are fixed, and one tag is set up at various locations to test the ranging precision. In the study, the Decawave TREK1000 UWB transceivers were used as the listening device or tag (e.g., 108). The active anchor devices (e.g., 102) were set 60.0 cm apart. FIG. 6 shows the approximate locations of the active anchor devices and the listening device in the experimental setup. In FIG. 6, the listening device was placed at 9 representative locations nearby to 2 devices actively engaging in ranging determination according to 802.15.4 exchange. In the study, Equation 3 was used. At each location, 1000 samples of measurements were recorded for both the traditional TDoA and the exemplary method.

The listening device was placed at 9 different locations. The true distances of the setup are shown in Table 3.

TABLE 3

| Location | Distance to Anchor A | Distance to Anchor B |
| --- | --- | --- |
| 1 | 21.5 cm | 51.0 cm |
| 2 | 42.5 cm | 26.0 cm |
| 3 | 90.0 cm | 37.0 cm |

TABLE 3-continued

| Location | Distance to Anchor A | Distance to Anchor B |
|---|---|---|
| 4 | 91.5 cm | 42.0 cm |
| 5 | 26.0 cm | 34.5 cm |
| 6 | 47.5 cm | 20.0 cm |
| 7 | 29.0 cm | 49.0 cm |
| 8 | 34.0 cm | 91.0 cm |
| 9 | 15.5 cm | 75.0 cm |

The experiment was performed with clock drift consideration. Real clocks on various hardware may not be ideal. In a sensitivity analysis, the analysis relaxes the assumption that all clocks are consistent with a global clock.

In the analysis, the clock of active devices "A," "B," and the listening device "T" may have drifts $\delta_A$, $\delta_B$, and $\delta_T$. Time measures $R_A$ and $D_A$ may be measured by an imperfect clock of device "A" as $\hat{R}_A$ and $\hat{D}_A$. Time measures $R_B$ and $D_B$ may be measured by an imperfect clock of device "B" as $\hat{R}_B$ and $\hat{D}_B$. And time measures $R_{T1}$ and $R_{T2}$ may be measured by an imperfect clock of device "T" as $\hat{R}_{T1}$ and $\hat{R}_{T2}$ with the following relations as shown in Equations 6.

$$\hat{R}_A = (1+\delta_A)R_A$$
$$\hat{D}_A = (1+\delta_A)D_A$$
$$\hat{R}_B = (1+\delta_B)R_B$$
$$\hat{D}_B = (1+\delta_B)R_B$$
$$\hat{R}_{T1} = (1+\delta_T)R_{T1}$$
$$\hat{R}_{T2} = (1+\delta_T)R_{T2} \quad \text{(Eq. 6)}$$

Figure 7A:
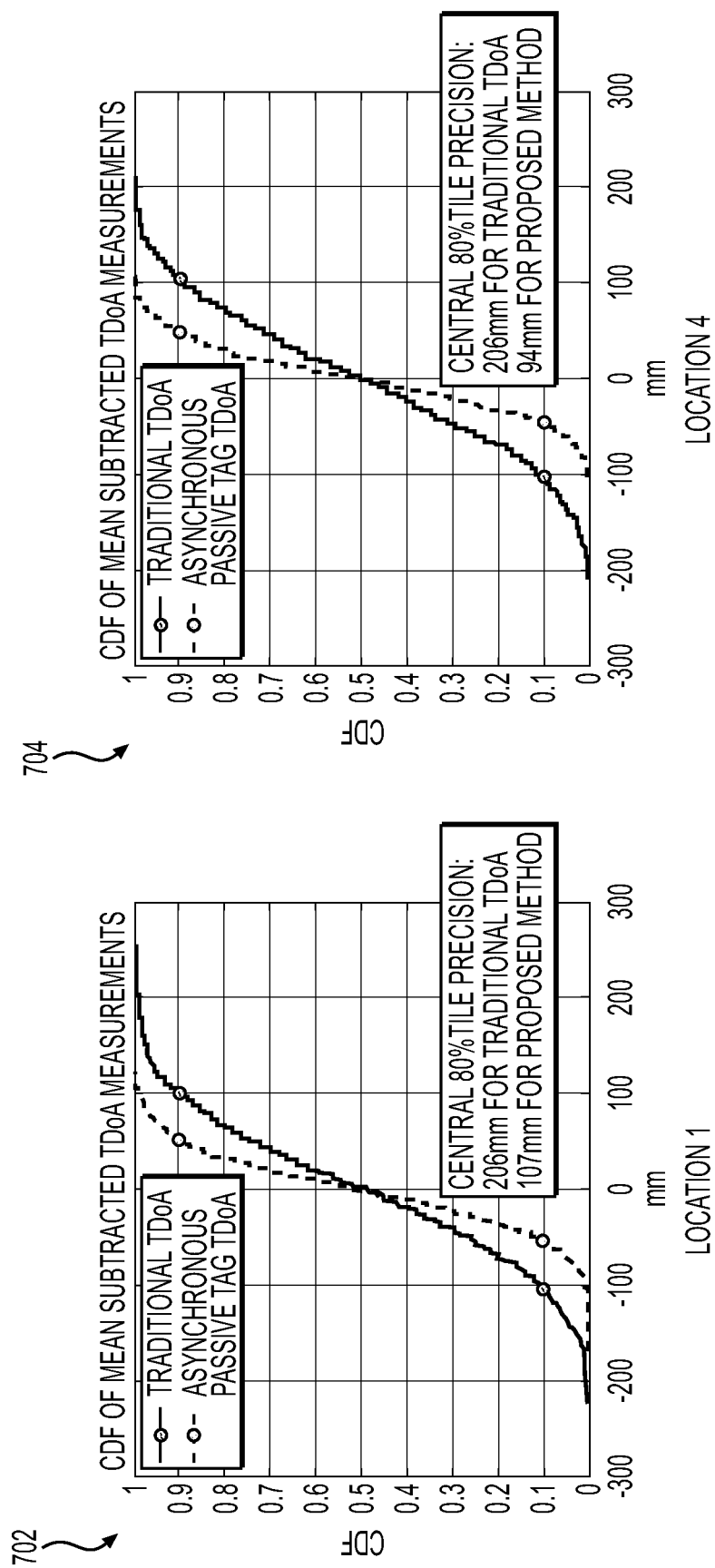
FIGS. 7A and 7B each shows the performance of the asynchronous passive-listening TDoA operation for the experimental setup of FIG. 6 quantified as a set of cumulative distribution functions of the equivalent distance of the mean subtracted TDoA measurements in accordance with an illustrative embodiment.
Figure 7A:
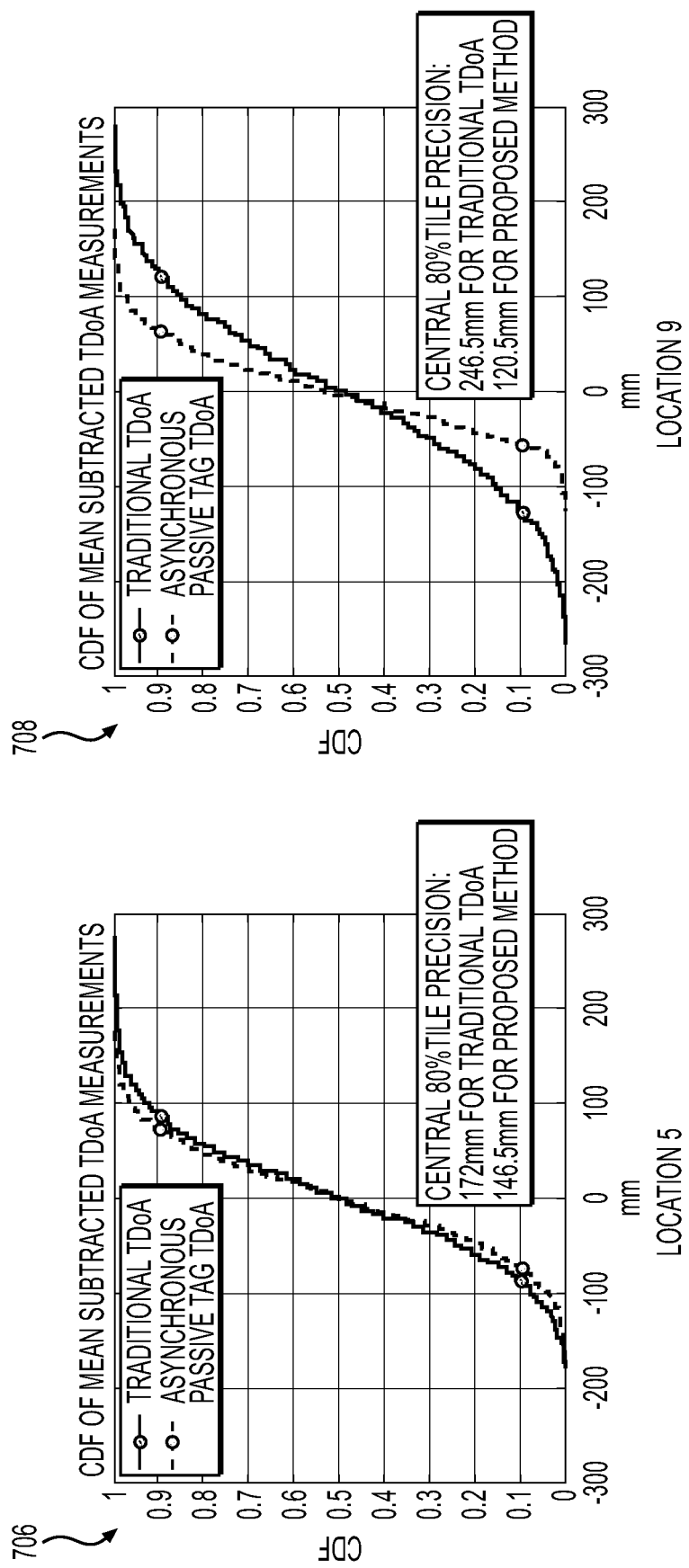

FIG. 7A shows the cumulative distribution functions of the equivalent distance of the mean subtracted TDoA measurements according to conventional TDoA [5] and the exemplary asynchronous passive-listening TDoA operation at 4 test locations (location "1" 702, location "4" 704, location "5" 706, and location "9" 708). The cumulative distribution function (CDF) in FIG. 7A are shown in equivalent distance in millimeter. The 90th percentile and the 10th percentile are labeled as dots on the graph, and their differences are shown in the textbox. It can be observed in FIG. 7A that the exemplary asynchronous passive-listening TDoA operation is more robust, having higher precision at all locations around the anchors than the conventional TDoA method.

Figure 7B:
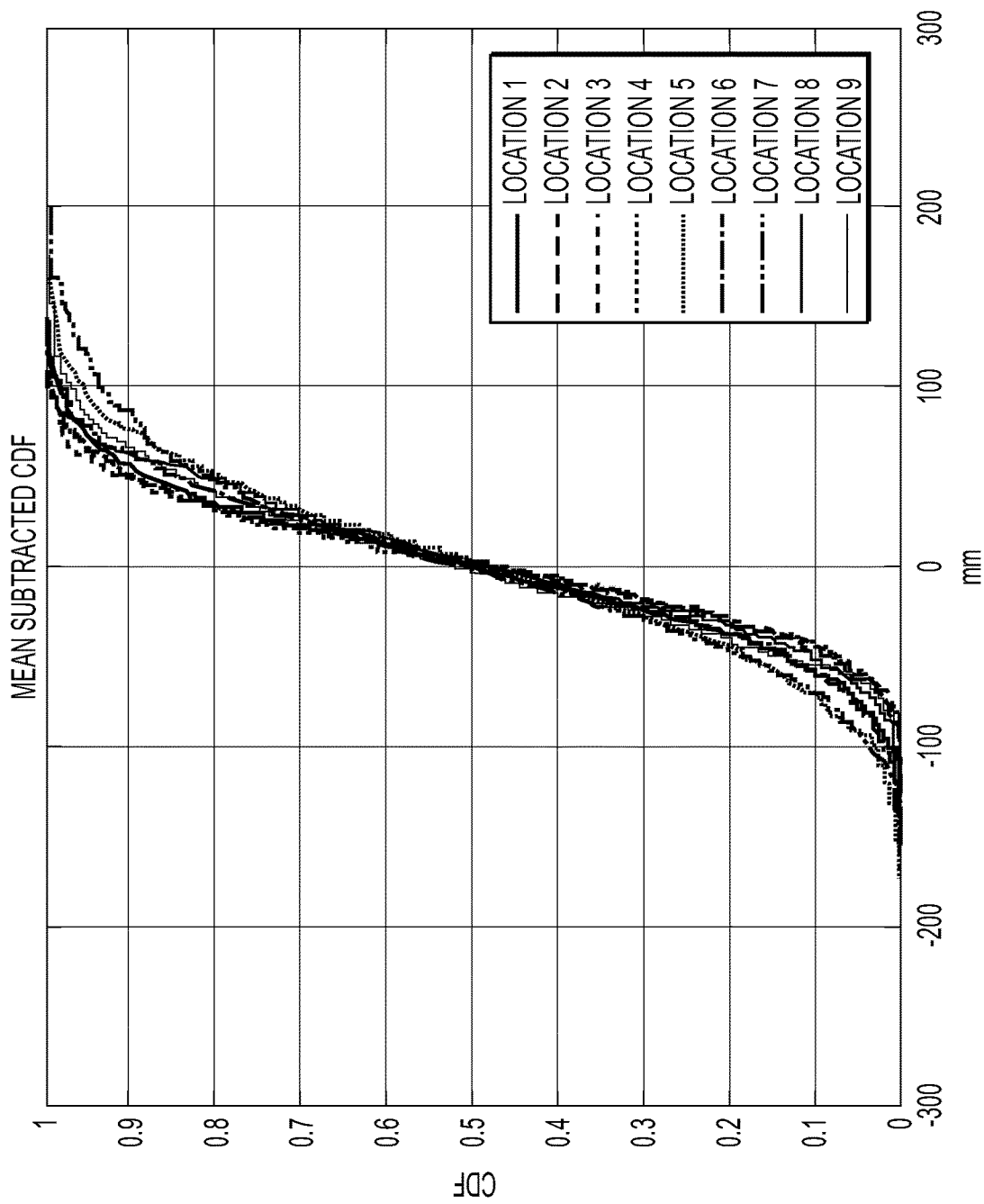

FIG. 7B shows the CDF of the equivalent distance of the mean subtracted TDoA measurements of the exemplary asynchronous passive-listening TDoA operation for the nine locations. As shown in FIG. 7B, the performance of the exemplary method is consistent for the evaluated device locations.

Figure 8:
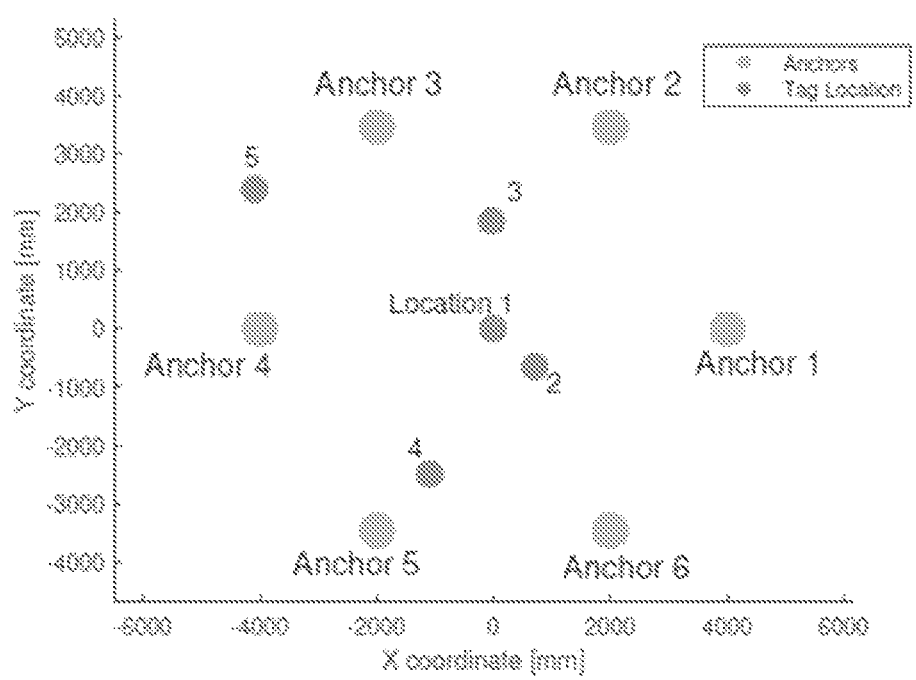
FIG. 8 shows another experimental setup for the asynchronous passive-listening TDoA operation, the setup comprising a set of more than two active anchor devices and a listening device in accordance with an illustrative embodiment.

A second part of the study evaluates the use of multiple active anchor devices. FIG. 8 shows an experiment setup comprising multiple active anchor devices. In FIG. 8, six anchors are shown having been deployed and the exemplary asynchronous passive-listening TDoA devices being evaluated at five locations. Tables 4 and 5 list the true locations of the active anchor devices and the evaluated locations of the asynchronous passive tag TDoA devices.

TABLE 4

| Anchor 1 | (4000, 0) mm |
|---|---|
| Anchor 2 | (2000, 3464) mm |
| Anchor 3 | (−2000, 3464) mm |

TABLE 4-continued

| Anchor 4 | (−4000, 0) mm |
|---|---|
| Anchor 5 | (−2000, −3464) mm |
| Anchor 6 | (2000, −3464) mm |

TABLE 5

| Location 1 | (−6, 7) mm |
|---|---|
| Location 2 | (709, −658) mm |
| Location 3 | (−32, 1852) mm |
| Location 4 | (−1094, −2499) mm |
| Location 5 | (−4093, 2393) mm |

Figure 9:
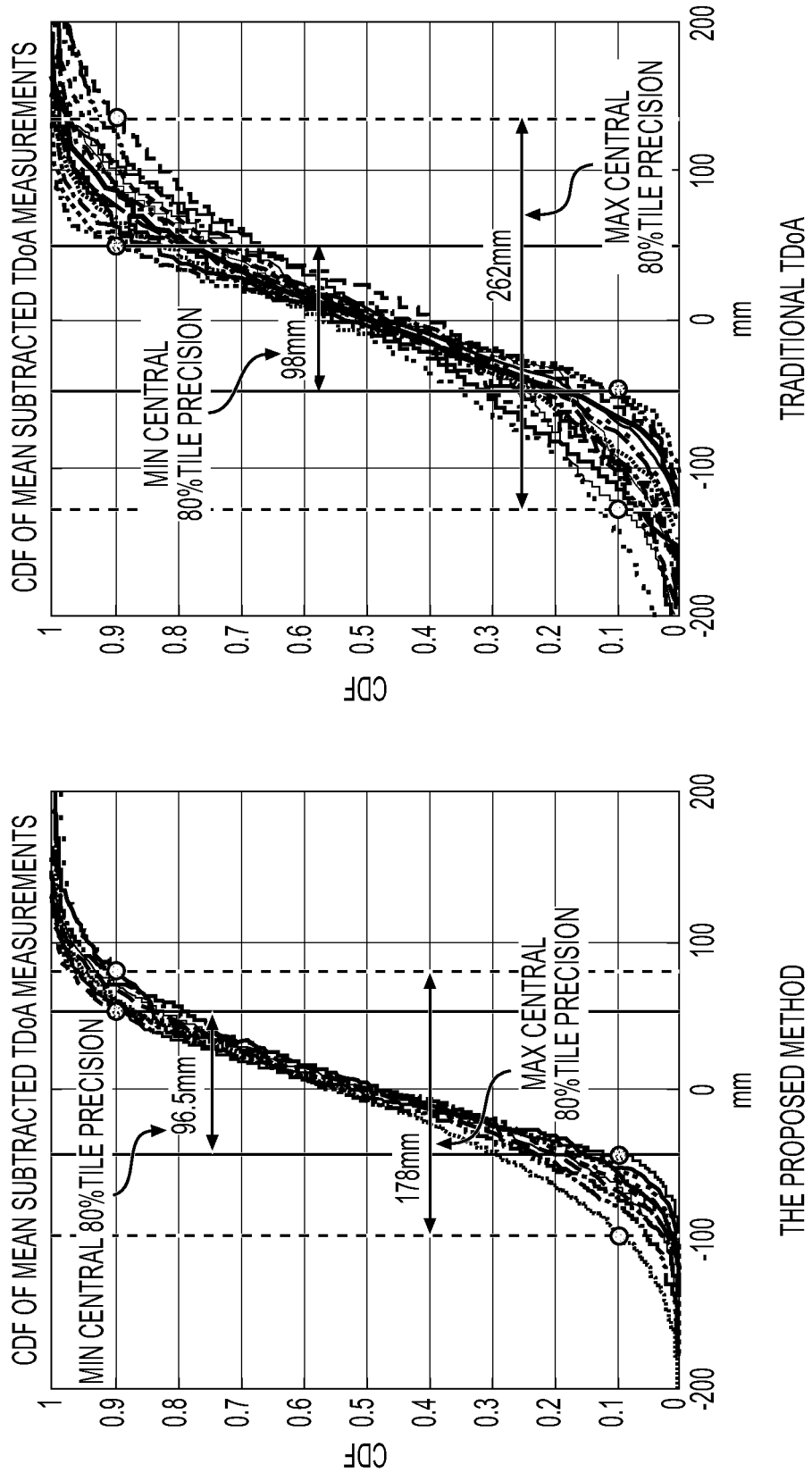
FIG. 9 shows the performance of the asynchronous passive-listening TDoA operation for the experimental setup of FIG. 8 quantified as a set of cumulative distribution functions of the equivalent distance of the mean subtracted TDoA measurements in accordance with an illustrative embodiment.

FIG. 9 shows the cumulative distribution function (CDF) of equivalent distance (in millimeter) of mean subtracted TDoA measurements of conventional TDoA method and the exemplary asynchronous passive-listening TDoA devices at five evaluated locations and for all anchor pairs. The 90$^{th}$ percentile and the 10th percentile that have the maximum and minimum central 80 percentile range are labeled as dots on the graph. It can be observed that the exemplary asynchronous passive-listening TDoA method s more robust across different tag locations and anchor pairs than the conventional TDoA method.

Figure 10:
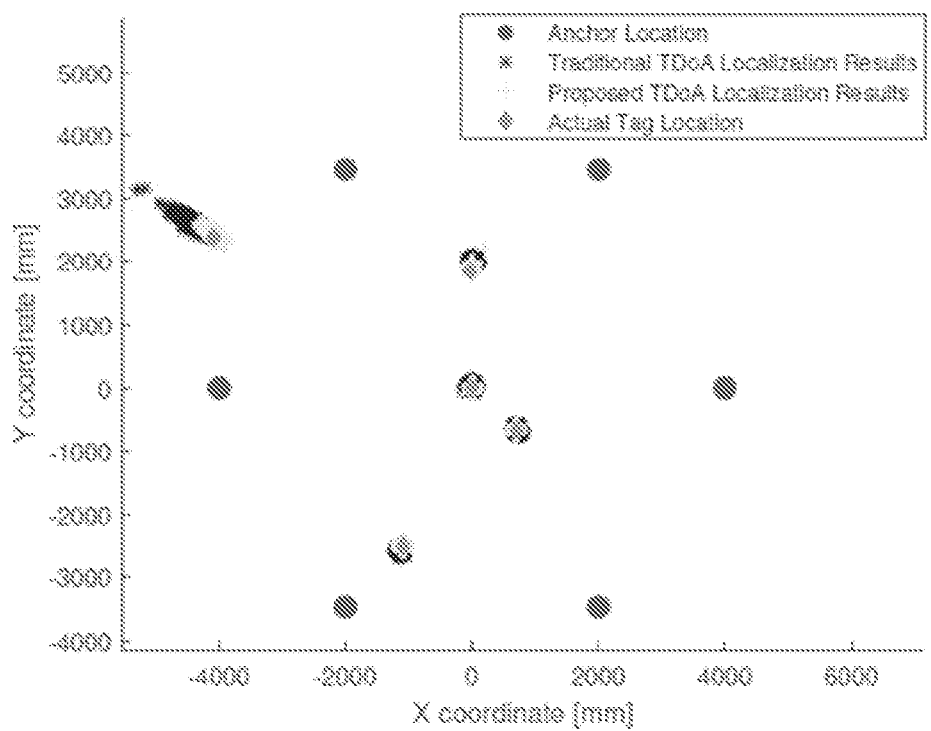
FIGS. 10 and 11 show experimental results of an example localization determination using the exemplary TDoA method on the setup of FIG. 8 in accordance with an illustrative embodiment.
Figure 11:
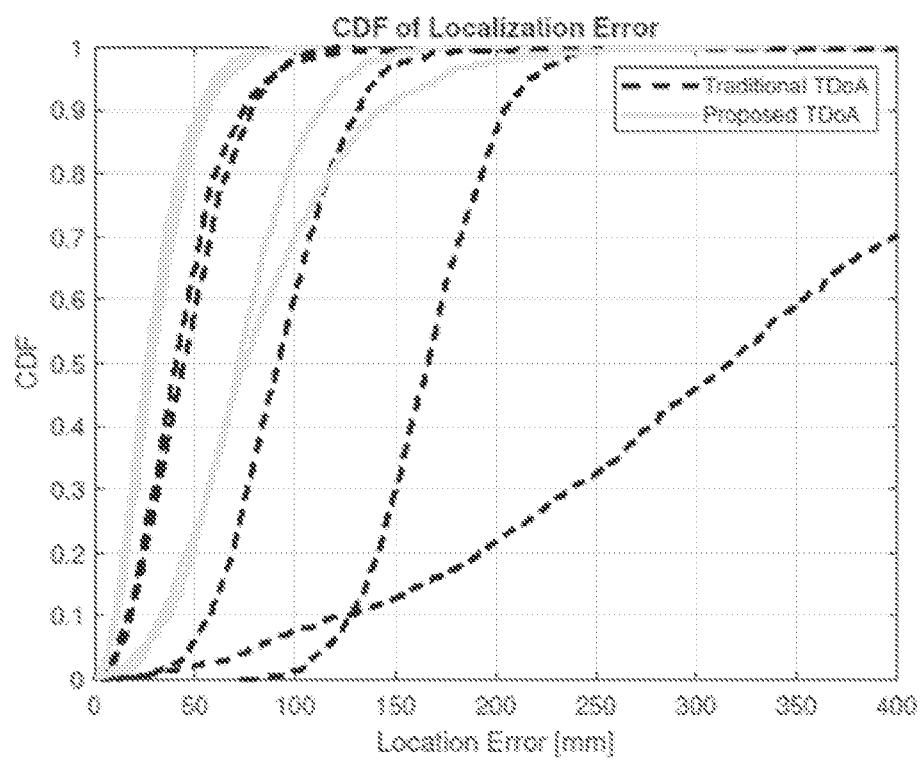

FIGS. 10 and 11 show experimental results of an example localization determination using the exemplary TDoA method on the setup of FIG. 8 in conjunction with a Levenberg-Marquardt Algorithm as the solver. FIG. 10 shows the output position results using the exemplary TDoA method and a compared conventional TDoA method [5]. FIG. 11 shows the cumulative distribution function (CDF) of localization error. In FIG. 11, it is observed that the 90th percentile localization error of the exemplary TDoA method for all 5 tag locations is below 150 mm and outperforms the traditional TDoA method [5].

Discussion

The exemplary method can be used to improve the robustness of the time difference of arrival-based ranging. It can be a fundamental contribution with impact to indoor and outdoor localization. More specifically, previous works require tight synchronization and provide lower precision due to clock drifts. The exemplary embodiment can be used to obtain better precision.

In addition, there are several other benefits of the exemplary method compared to the existing methods: Privacy-preserving: because the tags do not need to transmit anything, they can localize themselves without letting other devices know of their presence or location; Scalability: because the tags are passively listening, theoretically the system can handle an unlimited number of tags because they do not interfere with each other; Accuracy: based on the error analysis above, the system is robust against clock drifts. The error is on the scale of picoseconds, which is equivalently sub-millimeter in the distance.

The fundamental operating principle of traditional TDoA indoor localization systems employs measuring the difference in the arrival time of a blink message sent by the tag received at all the anchors. The anchors are synchronized prior to localization to produce accurate results. The TDoA measurements can then be used by a hyperbolic solver to determine the location of the tag. In a similar "upstream" TDoA system, the anchors transmit the beacon messages while the tag listens and performs TDoA measurements. However, in both systems, the requirement for high precision clock synchronization between the anchors can be expensive in practice. In contrast, the exemplary method for a tag device can localize itself by overhearing messages exchanged by other anchor devices. In some embodiments, the exemplary method can be used for localization application. In some embodiments, the exemplary method can be used for UWB and various technology present in the latest generations of smart and portable devices.

Another form of localization is through the measurement of time-of-arrival (ToA). In ToA ranging, the distance between two devices can be calculated by measuring their round-trip time through exchanging messages. A state-of-the-art scheme proposed by McLaughlin et al. (U.S. Pat. No. 2018/0059235) describes a two-way ranging (TWR) method through a 4-message exchange between two devices, which is robust against clock drift error and does not have restriction on the choice of response time. However, ToA requires active participation by both devices. Instead, this invention allows passive tag localization.

Mathematical Proof of TDoA Method

The proof for the formulation in Equations 1-3 is provided herein. Denoting the ToA between AB, AT and BT as $\rho_{AB}$, $\rho_{AT}$, and $\rho_{BT}$, and the TDoA of A and B's messages at T as $T_{AB} = \rho_{BT} - \rho_{AT}$, the following relations can be obtained per Equations 7 and 8:

$$R_{T1} = \rho_{AB} + D_B + T_{AB} = R_A - \rho_{AB} + T_{AB} \quad \text{(Eq. 7)}$$

$$R_{T1} = \rho_{AB} + D_A - T_{AB} = R_B - \rho_{AB} - T_{AB} \quad \text{(Eq. 8)}$$

In Equations 4 and 5, $D_A$, $D_B$ are the response delay defined by the system, and $R_A$, $R_B$ and $R_{T1}$, $R_{T2}$ can be precisely measured. Rearranging the equations above leads to Equations 9 and 10:

$$D_A = R_{T2} - \rho_{AB} + T_{AB} \quad \text{(Eq. 9)}$$

$$R_{T1} = R_A - \rho_{AB} + T_{AB} \quad \text{(Eq. 10)}$$

Multiplying Equation 9 and Equation 10 results in Equation 11:

$$D_A R_{T1} = (R_{T2} - \rho_{AB} + T_{AB})(R_A - \rho_{AB} + T_{AB}) \quad \text{(Eq. 11)}$$
$$= (R_{T2} R_A + (-\rho_{AB} + T_{AB})(-\rho_{AB} + T_{AB} + R_{T2} + R_A)$$
$$D_A R_{T1} - R_{T2} R_A = (-\rho_{AB} + T_{AB})(-\rho_{AB} + T_{AB} + R_{T2} + R_A)$$

From Equation 9, it can be obtained that $T_{AB} = -R_{T2} + \rho_{AB} + D_A$, which can be substituted into Equation 11, leading to Equation 12:

$$D_A R_{T1} - R_{T2} R_A = (-\rho_{AB} + T_{AB})(-\rho_{AB} - R_{T2} + \rho_{AB} + D_A + R_{T2} + R_A) \quad \text{(Eq. 12)}$$
$$= (-\rho_{AB} + T_{AB})(D_A + R_A)$$
$$T_{AB} = \frac{D_A R_{T1} - R_{T2} R_A}{D_A + R_A} + \rho_{AB}$$

Similarly, Equation 7 and 8 can be rearranged into Equations 13 and 14:

$$R_{T1} = D_B + \rho_{AB} + T_{AB} \quad \text{(Eq. 13)}$$

$$R_B = R_{T2} + \rho_{AB} + T_{AB} \quad \text{(Eq. 14)}$$

Multiplying Equation 13 and Equation 14 can yield Equation 15:

$$R_{T1} R_B = (D_B + \rho_{AB} + T_{AB})(R_{T2} + \rho_{AB} + T_{AB}) \quad \text{(Eq. 15)}$$
$$= D_B R_{T2} + (\rho_{AB} + T_{AB})(\rho_{AB} + T_{AB} + D_B + R_{T2})$$

-continued
$$R_{T1} R_B - D_B R_{T2} = (\rho_{AB} + T_{AB})(\rho_{AB} + T_{AB} + D_B + R_{T2})$$

Substituting in $R_{T2} = R_B - \rho_{AB} - T_{AB}$ gives Equation 16.

$$R_{T1} R_B - D_B R_{T2} = (\rho_{AB} + T_{AB})(R_B + D_B) \quad \text{(Eq. 16)}$$
$$T_{AB} = \frac{R_{T1} R_B - D_B R_{T2}}{R_B + D_B} - \rho_{AB}$$

Summing up Equation 12 and Equation 16 and using the relationship that $R_A + D_A = R_B + D_B = R_{T1} + R_{T2}$, it can be obtained that $T_{AB}$ can be determined as Equation 17, which is the same as Equation 3 above. Equation 17 is exact and in ideal conditions can provide accurate TDoA results.

$$T_{AB} = \frac{D_A R_{T1} - R_{T2} R_A + R_B R_{T1} - R_{T2} D_B}{2(R_{T1} + R_{T2})} \quad \text{(Eq. 17)}$$

Other derivation may be employed without departing from the disclosed provided herein.

It should be appreciated that the logical operations described above and in the appendix can be implemented as a sequence of computer-implemented acts or program modules running on a computing system and/or as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the 1$^{st}$ reference in the list. All references cited and discussed in this specification are incorporated herein by reference in their entireties and to the same extent as if each reference was individually incorporated by reference.

Moreover, the various components may be in communication via wireless and/or hardwire or other desirable and available communication means, systems, and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications as listed below and throughout this document are hereby incorporated by reference in their entirety herein.

[1] 2018/0059235 A1 March 2018 McLaughlin et al.
[2] IEEE, IEEE Standard for Local and metropolitan area networks—Part 15.4: Low-Rate Wireless Personal Area Networks (LR-WPANs), vol. 2011, September. 2011.
[3] A. Ledergerber, M. Hamer, and R. D'Andrea, "A robot self-localization system using one-way ultra-wideband communication," IEEE Int. Conf. Intel. Robot. Syst., vol. 2015-December, pp. 3131-3137, 2015.
[4] LAN/MAN Standards Committee. (2020). *IEEE Standard for Low-Rate Wireless Networks. Amendment* 1: *Enhanced Ultra Wideband (UWB) Physical Layers (PHYs) and Associated Ranging Techniques (IEEE Std 802.15.4z)* (Vol. 2020). Retrieved from https://standards.ieee.org/standard/index.html
[5] A. Ledergerber, M. Hamer, and R. D'Andrea, "A robot self-localization system using one-way ultra-wideband communication," in 2015 IEEE/RSJ International Conference on Intelligent Robots and Systems (IROS), 2015, vol. 2015-December, pp. 3131-3137.

What is claimed is:

1. A method comprising:
receiving at an asynchronous passive-listening TDoA device a first message transmitted from a first active device in a communication exchange with a second active device having a distance therebetween;
receiving at the asynchronous passive-listening TDoA device a second message transmitted from the second active device in reply to the first transmitted message;
receiving at the asynchronous passive-listening TDoA device a third message transmitted from the first active device in reply to the second transmitted message;
determining, by a processor of the asynchronous passive-listening TDoA device, a first time difference ($R_{T1}$) between a first measured time corresponding to receipt of the first message and a second measured time corresponding to receipt of the second message;
determining, by the processor, a second time difference ($R_{T2}$) between the second measured time corresponding to the receipt of the second message and a third measured time corresponding to receipt of the third message; and
determining, by the processor, a time difference of arrival (TDoA) value corresponding to the difference between the asynchronous passive-listening TDoA device to first active device distance and the asynchronous passive-listening TDoA device to second active device distance using (i) the first time difference ($R_{T1}$) as observed by the asynchronous passive-listening TDoA device,
(ii) the second time difference ($R_{T2}$) as observed by the asynchronous passive-listening TDoA device,
(iii) one or more of (a) a time measures ($D_A$) defined between the receipt of the second message at the first active device and the transmission of the third message by the first active device, (b) a time measure ($D_B$) defined between the receipt of the first message at the second active device and the transmission of the second message by the second active device obtained by the asynchronous passive-listening TDoA device, and
(iv) at least one of (a) a time measure ($R_A$) defined between the transmission of the first message and the receipt of the second message at the first active device, (b) a time measure ($R_B$) defined between the transmission of the second message and the receipt of the third message at the second active device, or (c) a time measure ($\rho_{AB}$) corresponding to a time between when the first message was transmitted at the first active device and received at the second active device, according to at least one of:

$$T_{AB} = \frac{D_A R_{T1} - R_{T2} R_A}{R_A + D_A} + \rho_{AB}$$

$$T_{AB} = \frac{R_B R_{T1} - R_{T2} D_B}{R_B + D_B} - \rho_{AB}$$

$$T_{AB} = \frac{D_A R_{T1} - R_{T2} R_A + R_B R_{T1} - R_{T2} D_B}{2(R_{T1} + R_{T2})}$$

wherein the time difference of arrival (TDoA) value ($T_{AB}$) is used by the asynchronous passive-listening TDoA device in a ranging or localization operation to obtain its own location.

2. The method of claim 1, wherein the time difference of arrival (TDoA) value ($T_{AB}$) between the first active device and the second active device is determined using the first time difference ($R_{T1}$), the second time difference ($R_{T2}$), a first time measure defined between a receipt of the second message at the first active device and the transmission of the third message by the first active device, and a second time measure defined between a transmission of the first message and a receipt of the second message at the first active device.

3. The method of claim 2, wherein the time difference of arrival (TDoA) value, $T_{AB}$, is determined according to:

$$T_{AB} = \frac{D_A R_{T1} - R_{T2} R_A}{R_A + D_A} + \rho_{AB}$$

wherein $D_A$ is the first time measure defined between the receipt of the second message at the first active device and the transmission of the third message by the first active device, $R_A$ is the second time measure defined between the transmission of the first message and the receipt of the second message at the first active device, $R_{T1}$ is the first time difference between the first measured time corresponding to the receipt of the first message and the second measured time corresponding to receipt of the second message at the asynchronous passive-listening TDoA device, $R_{T2}$ is the second time difference between the second measured time corresponding to the receipt of the second message and the third measured time corresponding to the receipt of the third message, and $\rho_{AB}$ corresponds to the time between when the first message was transmitted at the first active device and received at the second active device.

4. The method of claim 2, wherein $\rho_{AB}$ as a fifth time measure corresponding to a time between when the first message was transmitted at the first active device and received at the second active device, is either obtained prior to the transmission of the first, second and the third message, or continuously measured according to the 802.15.4z protocol.

5. The method of claim 1, wherein the time difference of arrival (TDoA) value, $T_{AB}$, between the first active device and the second active device is determined using the first time difference ($R_{T1}$), the second time difference ($R_{T2}$), a third time measure defined between a receipt of the first message at the second active device and the transmission of the second message by the second active device, and a fourth time measure defined between a transmission of the second message and a receipt of the third message at the second active device.

6. The method of claim 5, wherein the time difference of arrival (TDoA) value, $T_{AB}$, is determined according to:

$$T_{AB} = \frac{R_B R_{T1} - R_{T2} D_B}{R_B + D_B} - \rho_{AB}$$

wherein $D_B$ is the third time measure defined between the receipt of the first message at the second active device and the transmission of the second message by the second active device, and $R_B$ is the fourth time measure defined between the transmission of the second message and the receipt of the third message at the second active device.

7. The method of claim 5, wherein the fourth time measure $R_B$ is included in a fifth message transmitted by the second active device in a subsequent cycle of a current cycle, wherein the current cycle includes the first, second, and third message, wherein the subsequent cycle includes a fourth message and a fifth message, and wherein the fifth message is transmitted from the second active device as the second message in the subsequent cycle in reply to a fourth message transmitted by the first active device.

8. The method of claim 1, wherein the time difference of arrival (TDoA) value, $T_{AB}$, between the first active device and the second active device is determined using the first time difference, the second time difference, a first time measure defined between a receipt of the second message at the first active device and the transmission of the third message by the first active device, a second time measure defined between a transmission of the first message and a receipt of the second message at the first active device, a third time measure defined between a receipt of the first message at the second active device and the transmission of the second message by the second active device, and a fourth time measure defined between a transmission of the second message and a receipt of the third message at the second active device.

9. The method of claim 8, wherein the time difference of arrival (TDoA) value, $T_{AB}$, is determined according to:

$$T_{AB} = \frac{D_A R_{T1} - R_{T2} R_A + R_B R_{T1} - R_{T2} D_B}{2(R_{T1} + R_{T2})}$$

wherein $D_A$ is the first time measure defined between the receipt of the second message at the first active device and the transmission of the third message by the first active device, $R_A$ is the second time measure defined between the transmission of the first message and the receipt of the second message at the first active device, $D_B$ is the third time measure defined between the receipt of the first message at the second active device and the transmission of the second message by the second active device, and $R_B$ is the fourth time measure defined between the transmission of the second message and the receipt of the third message at the second active device.

10. The method of claim 1, wherein the first, second, and third messages are transmitted according to 802.15.4 or 802.15.4z protocols.

11. An asynchronous passive-listening time difference of arrival TDoA) device comprising:
a network interface;
a processor unit or logic circuit coupled to the network interface, the processor unit or logic circuit being configured to:
receive a first message transmitted from a first active device in a communication exchange with a second active device having a distance therebetween;
receive a second message transmitted from the second active device that is replying to the first transmitted message;
receive a third message transmitted from the first active device that is replying to the second transmitted message;
determine a first time difference ($R_{T1}$) between a first measured time corresponding to receipt of the first message and a second measured time corresponding to receipt of the second message;
determine a second time difference ($R_{T2}$) between the second measured time corresponding to the receipt of the second message and a third measured time corresponding to receipt of the third message; and
determine a time difference of arrival (TDoA) value (TAB) corresponding to the difference between the asynchronous passive-listening TDoA device to first active device distance and the asynchronous passive-listening TDoA device to second active device distance using
(i) the first time difference ($R_{T1}$) as observed by the the asynchronous passive-listening TDoA device,
(ii) the second time difference ($R_{T2}$) as observed by the the asynchronous passive-listening TDoA device, and
(iii) one or more of (a) a time measure ($D_A$) defined between the receipt of the second message at the first active device and the transmission of the third message by the first active device, (b) a time measure ($D_B$) defined between the receipt of the first message at the second active device and the transmission of the second message by the second active device obtained by the asynchronous passive-listening TDoA device, and
(iv) at least one of (a) a time measure ($R_A$) defined between the transmission of the first message and the receipt of the second message at the first active device, (b) a time measure ($R_B$) defined between the transmission of the second message and the receipt of the third message at the second active device, or (c) a time measure ($\rho_{Ab}$) corresponding to a time between when the first message was transmitted at the first active device and received at the second active device, according to at least one of:

$$T_{AB} = \frac{D_A R_{T1} - R_{T2} R_A}{R_A + D_A} + \rho_{AB}$$

$$T_{AB} = \frac{R_B R_{T1} - R_{T2} D_B}{R_B + D_B} - \rho_{AB}$$

$$T_{AB} = \frac{D_A R_{T1} - R_{T2} R_A + R_B R_{T1} - R_{T2} D_B}{2(R_{T1} + R_{T2})}$$

wherein the time difference of arrival (TDoA) value ($T_{AB}$) is used by the the asynchronous passive-listening TDoA device in a ranging or localization operation to obtain its own location associated with an asynchronous passive-listening TDoA device in relation to the first active device and the second active device.

12. The device of claim 11, wherein the time difference of arrival (TDoA) value ($T_{AB}$) between the first active device and the second active device is determined using the first time difference ($R_{T1}$), the second time difference ($R_{T2}$), a first time measure defined between a receipt of the second message at the first active device and the transmission of the third message by the first active device, and a second time measure defined between a transmission of the first message and a receipt of the second message at the first active device.

13. The device of claim 12, wherein $\rho_{AB}$ as a fifth time measure corresponding to a time between when the first message was transmitted at the first active device and received at the second active device, is either obtained prior to the transmission of the first, second and the third message, or continuously measured according to the 802.15.4z protocol.

14. The device of claim 11, wherein the time difference of arrival (TDoA) value ($T_{AB}$) between the first active device and the second active device is determined using the first time difference ($R_{T1}$), the second time difference ($R_{T2}$), a third time measure defined between a receipt of the first message at the second active device and the transmission of the second message by the second active device, and a fourth time measure defined between a transmission of the second message and a receipt of the third message at the second active device.

15. The device of claim 14, wherein the fourth time measure $R_B$ is included in a fifth message transmitted by the second active device in a subsequent cycle of a current cycle, wherein the current cycle includes the first, second, and third message, wherein the subsequent cycle includes a fourth message and a fifth message, and wherein the fifth message is transmitted from the second active device as the second message in the subsequent cycle in reply to a fourth message transmitted by the first active device.

16. The device of claim 11, wherein the time difference of arrival (TDoA) value ($T_{AB}$) between the first active device and the second active device is determined using the first time difference ($R_{T1}$), the second time difference ($R_{T2}$), a first time measure defined between a receipt of the second message at the first active device and the transmission of the third message by the first active device, a second time measure defined between a transmission of the first message and a receipt of the second message at the first active device, a third time measure defined between a receipt of the first message at the second active device and the transmission of the second message by the second active device, and a fourth time measure defined between a transmission of the second message and a receipt of the third message at the second active device.

17. A non-transitory computer-readable medium having instructions stored thereon, wherein execution of the instructions by a processor cause the processor to:

receive a first message transmitted from a first active device in a communication exchange with a second active device having a distance therebetween;

receive a second message transmitted from the second active device that is replying to the first transmitted message;

receive a third message transmitted from the first active device that is replying to the second transmitted message;

determine a first time difference ($R_{T1}$) between a first measured time corresponding to receipt of the first message and a second measured time corresponding to receipt of the second message;

determine a second time difference ($R_{T2}$) between the second measured time corresponding to the receipt of the second message and a third measured time corresponding to receipt of the third message; and determine a time difference of arrival (TDoA) value (TAB) corresponding to the difference between the asynchronous passive-listening TDoA device to first active device distance and the asynchronous passive-listening TDoA device to second active device distance using (i) the first time difference ($R_{T1}$) as observed by the the asynchronous passive-listening TDoA device, (ii) the second time difference ($R_{T2}$) as observed by the the asynchronous passive-listening TDoA device, and (iii) one or more of (a) a time measure ($D_A$) defined between the receipt of the second message at the first active device and the transmission of the third message by the first active device, (b) a time measure ($D_B$) defined between the receipt of the first message at the second active device and the transmission of the second message by the second active device obtained by the asynchronous passive-listening TDoA device, and (iv) at least one of (a) a time measure ($R_A$) defined between the transmission of the first message and the receipt of the second message at the first active device, (b) a time measure ($R_B$) defined between the transmission of the second message and the receipt of the third message at the second active device, or (c) a time measure ($\rho_{AR}$) corresponding to a time between when the first message was transmitted at the first active device and received at the second active device, according to at least one of:

$$T_{AB} = \frac{D_A R_{T1} - R_{T2} R_A}{R_A + D_A} + \rho_{AB}$$

$$T_{AB} = \frac{R_B R_{T1} - R_{T2} D_B}{R_B + D_B} - \rho_{AB}$$

$$T_{AB} = \frac{D_A R_{T1} - R_{T2} R_A + R_B R_{T1} - R_{T2} D_B}{2(R_{T1} + R_{T2})}$$

wherein the time difference of arrival (TDoA) value ($T_{AB}$) is used by the the asynchronous passive-listening TDoA device in a ranging or localization operation to obtain its own location associated with an asynchronous passive-listening TDoA device in relation to the first active device and the second active device.

\* \* \* \* \*

UNITED STATES PATENT AND TRADEMARK OFFICE
CERTIFICATE OF CORRECTION

PATENT NO. : 12,235,377 B2  
APPLICATION NO. : 18/271912  
DATED : February 25, 2025  
INVENTOR(S) : Ashutosh Dhekne and Haige Chen Page 1 of 2

It is certified that error appears in the above-identified patent and that said Letters Patent is hereby corrected as shown below:

In the Claims

Column 21, Claim 1, Lines 5-6, reading:  
one or more of (a) a time measures (DA) defined between the receipt of the second message at the first...  
Should Read:  
one or more of (a) a time measure (DA) defined between the receipt of the second message at the first...

Column 23, Claim 11, Lines 16-17, reading:  
An asynchronous passive-listening time difference of arrival TDoA) device comprising:  
Should Read:  
An asynchronous passive-listening time difference of arrival (TDoA) device comprising:

Column 23, Claim 11, Lines 40-41, reading:  
determine a time difference of arrival (TDoA) value (TAB) corresponding to the difference between the...  
Should Read:  
determine a time difference of arrival (TDoA) value ($T_{AB}$) corresponding to the difference between the...

Column 23, Claim 11, Lines 46-47, reading:  
the first time difference ($R_{T1}$) as observed by the the asynchronous passive-listening TDoA device...  
Should Read:  
the first time difference ($R_{T1}$) as observed by the asynchronous passive-listening TDoA device...

Column 23, Claim 11, Lines 48-49, reading:  
the second time difference ($R_{T2}$) as observed by the the asynchronous passive-listening TDoA device, and...

Signed and Sealed this  
Twenty-ninth Day of April, 2025

Coke Morgan Stewart  
*Acting Director of the United States Patent and Trademark Office*

Should Read:
the second time difference ($R_{T2}$) as observed by the asynchronous passive-listening TDoA device, and...

Column 23, Claim 11, Line 64, reading:
message at the second active device, or (c) a time measure (p$Ab$) corresponding to a time between when the first message was transmitted at the first active...
Should Read:
message at the second active device, or (c) a time measure ($\rho_{AB}$) corresponding to a time between when the first message was transmitted at the first active...

Column 24, Claim 11, Lines 10-11, reading:
wherein the time difference of arrival (TDoA) value ($T_{AB}$) is used by the the asynchronous passive-listening...
Should Read:
wherein the time difference of arrival (TDoA) value ($T_{AB}$) is used by the asynchronous passive-listening...

Column 25, Claim 17, Lines 21-22, reading:
determine a time difference of arrival (TDoA) value (TAB) corresponding to the difference between the...
Should Read:
determine a time difference of arrival (TDoA) value ($T_{AB}$) corresponding to the difference between the...

Column 25, Claim 17, Lines 27-29, reading:
(i) the first time difference ($R_{T1}$) as observed by the the asynchronous passive-listening TDoA device,
(ii) the second time difference ($R_{T2}$) as observed by the the asynchronous ...
Should Read:
(i) the first time difference ($R_{T1}$) as observed by the asynchronous passive-listening TDoA device,
(ii) the second time difference ($R_{T2}$) as observed by the asynchronous ...

Column 26, Claim 17, Lines 11-12, reading:
message at the second active device, or (c) a time measure ($_{par)}$ corresponding to a time between when...
Should Read:
message at the second active device, or (c) a time measure ($\rho_{AB}$) corresponding to a time between when...

Column 26, Claim 20, Lines 27-28, reading:
wherein the time difference of arrival (TDoA) value ($T_{AB}$) is used by the the asynchronous passive-listening TDoA device...
Should Read:
wherein the time difference of arrival (TDoA) value ($T_{AB}$) is used by the asynchronous passive-listening TDoA device...